United States Patent
Cohen et al.

(10) Patent No.: US 7,860,887 B2
(45) Date of Patent: Dec. 28, 2010

(54) CROSS-MEDIA STORAGE COORDINATION

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 351 days.

(21) Appl. No.: 11/799,039

(22) Filed: Apr. 30, 2007

(65) Prior Publication Data
US 2008/0201389 A1    Aug. 21, 2008

Related U.S. Application Data

(63) Continuation-in-part of application No. 11/709,904, filed on Feb. 20, 2007.

(51) Int. Cl.
G06F 7/00    (2006.01)
G06F 17/30    (2006.01)

(52) U.S. Cl. .................. 707/781; 707/802; 707/913; 707/999.106

(58) Field of Classification Search .............. 707/101, 707/102, 201, 203, 204, 781, 802, 913, 999.106
See application file for complete search history.

(56) References Cited

U.S. PATENT DOCUMENTS

| | | | |
|---|---|---|---|
| 5,446,874 A | 8/1995 | Waclawsky et al. | |
| 5,721,919 A * | 2/1998 | Morel et al. | 707/999.203 |
| 7,127,261 B2 | 10/2006 | Van Erlach | |
| 7,139,555 B2 | 11/2006 | Apfel | |
| 7,280,546 B1 * | 10/2007 | Sharma et al. | 370/401 |
| 2001/0042114 A1 | 11/2001 | Agrahram | |
| 2002/0015418 A1 | 2/2002 | Uemura | |
| 2002/0031092 A1 | 3/2002 | Wakabayashi et al. | |
| 2003/0018793 A1 | 1/2003 | Mora | |
| 2003/0177276 A1 | 9/2003 | Chiu et al. | |
| 2004/0148362 A1 * | 7/2004 | Friedman | 709/217 |
| 2004/0168205 A1 | 8/2004 | Nesvadba | |
| 2004/0187157 A1 | 9/2004 | Chong | |
| 2004/0240562 A1 * | 12/2004 | Bargeron et al. | 375/240.29 |
| 2005/0010686 A1 * | 1/2005 | Nishida et al. | 709/238 |
| 2005/0022252 A1 | 1/2005 | Shen | |

(Continued)

*Primary Examiner*—John E Breene
*Assistant Examiner*—Phong Nguyen
(74) *Attorney, Agent, or Firm*—Lee & Hayes, PLLC

(57) ABSTRACT

Methods and a media system and storage system for cross-media storage coordination include but are not limited to storing a first data version of specified content based on a particular media format; storing at least a second data version of related content based on a different media format; providing a cross-reference between the first data version and the at least second data version to enable coordinated management by a designated user and/or an approved device for search and possible retrieval of the first data version and/or the at least second data version; and implementing communication access by one or more parties and/or the designated user via a communication type that is correlated with the first data version and/or the at least second data version.

52 Claims, 14 Drawing Sheets

U.S. PATENT DOCUMENTS

| | | |
|---|---|---|
| 2005/0044316 A1 | 2/2005 | Kottomtharayil |
| 2005/0055418 A1 | 3/2005 | Blanc et al. |
| 2005/0080755 A1 | 4/2005 | Aoyama |
| 2005/0160070 A1 | 7/2005 | Mashni et al. |
| 2005/0197964 A1* | 9/2005 | Duggan ................. 705/57 |
| 2005/0232166 A1 | 10/2005 | Nierhaus |
| 2005/0262144 A1 | 11/2005 | Teng |
| 2006/0090082 A1* | 4/2006 | Apostolopoulos ........... 713/189 |
| 2006/0101060 A1 | 5/2006 | Li |
| 2006/0167956 A1* | 7/2006 | Chasen et al. ............... 707/203 |
| 2006/0173859 A1 | 8/2006 | Kim et al. |
| 2008/0077694 A1 | 3/2008 | Nordmark et al. |
| 2008/0282353 A1* | 11/2008 | Kamperman et al. .......... 726/26 |
| 2009/0086975 A1* | 4/2009 | Robert et al. ............... 380/277 |

* cited by examiner

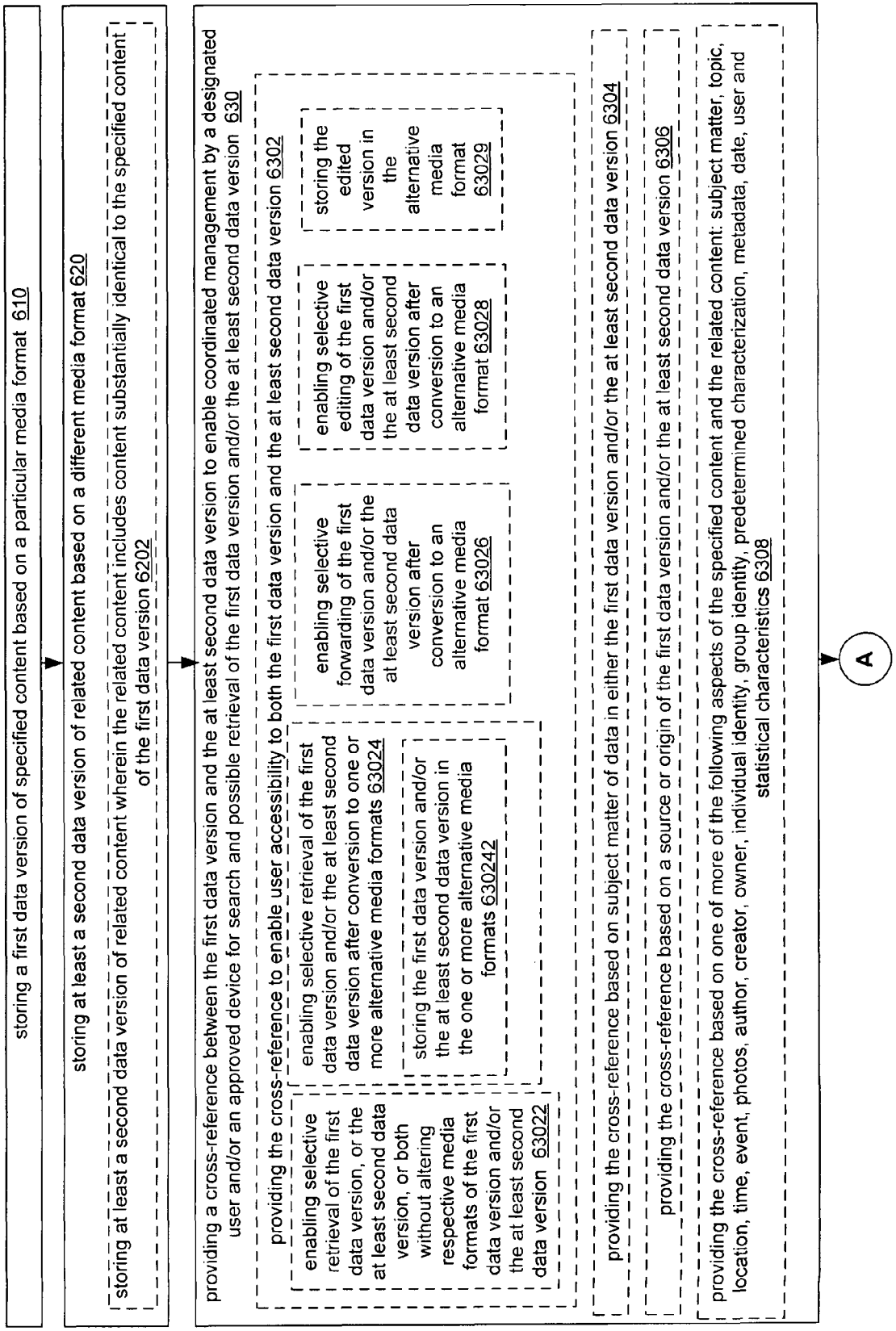

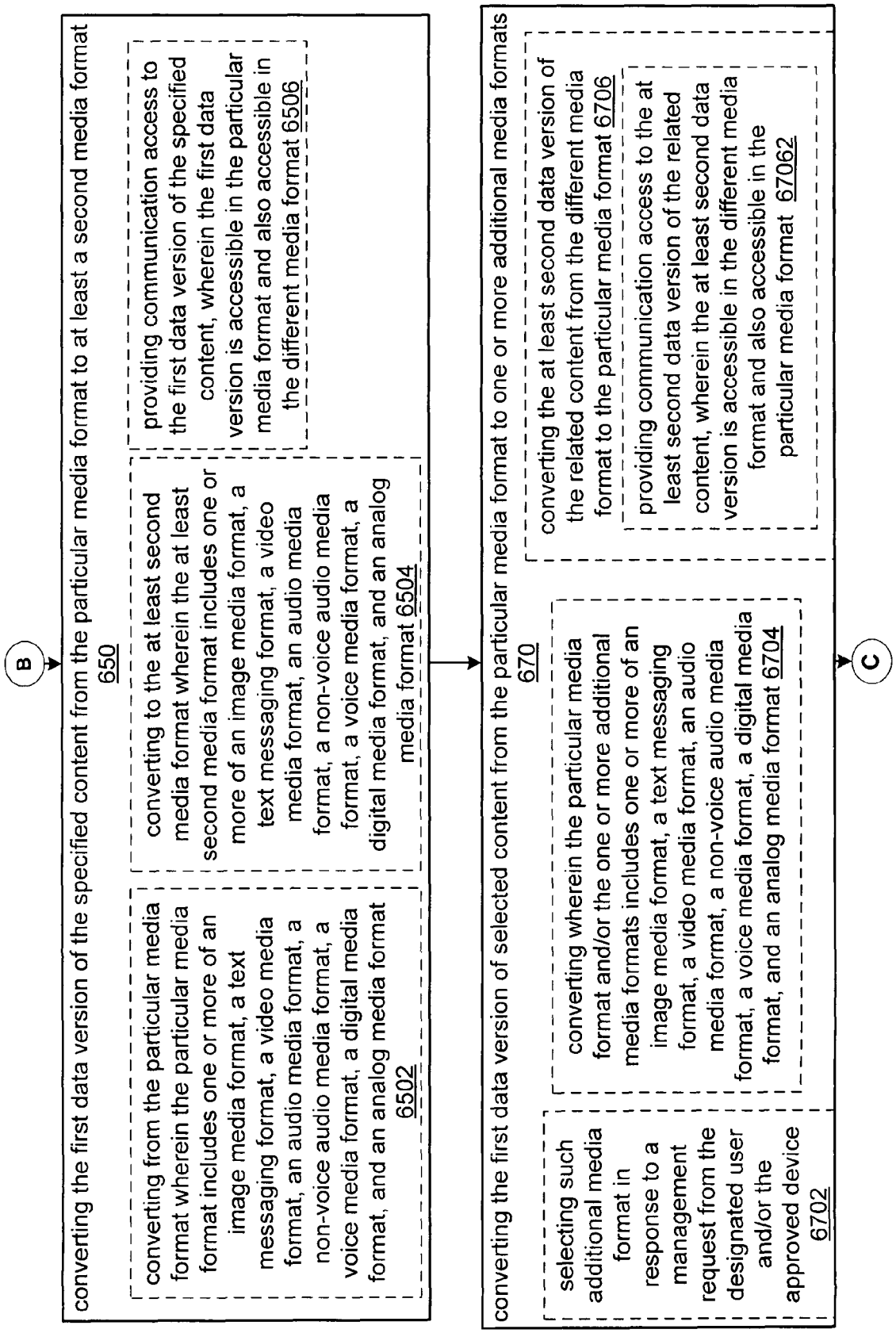

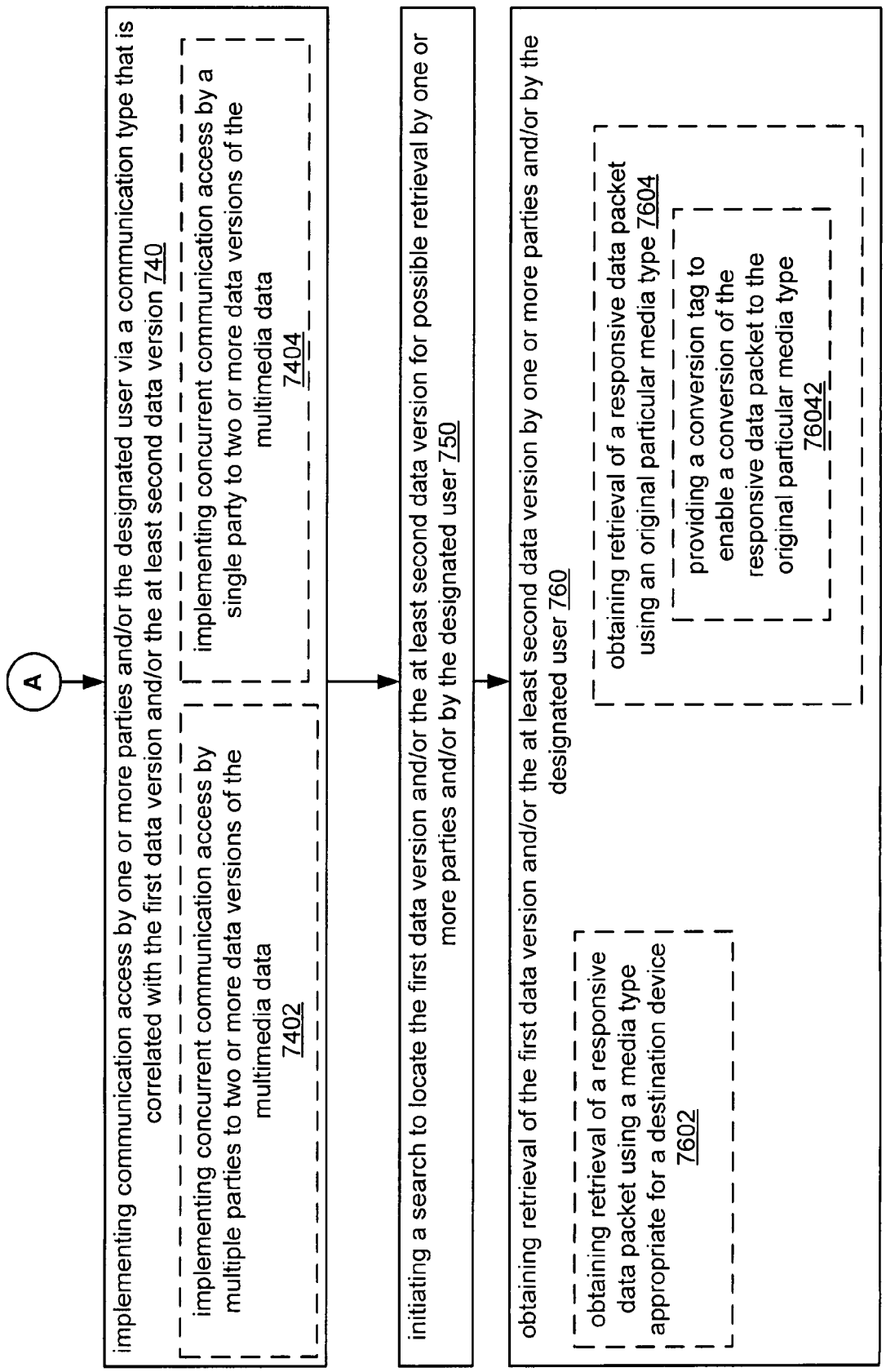

CROSS-MEDIA STORAGE COORDINATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/709,904, entitled CROSS-MEDIA COMMUNICATION COORDINATION, naming Alexander J. Cohen, Edward K. Y. Jung, Royce A. Levien, Robert W. Lord, Mark A. Malamud, William Henry Mangione-Smith, John D. Rinaldo, Jr., and Clarence T. Tegreene as inventors, filed Feb. 20, 2007, which is currently co-pending, or is an application of which a currently co-pending application is entitled to the benefit of the filing date. The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application,* USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s)from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

The present application relates generally to cross-media storage coordination services, as well as various systems, processes and devices for implementing such services.

SUMMARY

In one aspect, a method for cross media storage coordination includes but is not limited to storing a first data version of specified content based on a particular media format; storing at least a second data version of related content based on a different media format; providing a cross-reference between the first data version and the at least second data version to enable coordinated management by a designated user and/or an approved device for search and possible retrieval of the first data version and/or the at least second data version; and implementing communication access by one or more parties and/or the designated user via a communication type that is correlated with the first data version and/or the at least second data version.

In another aspect, a computer program product related to communication coordination includes but is not limited to a signal bearing medium bearing at least one of one or more instructions for storing a first data version of specified content based on a particular media format; one or more instructions for storing at least a second data version of related content based on a different media format; one or more instructions for providing a cross-reference between the first data version and the at least second data version to enable coordinated management by a designated user and/or an approved device for search and possible retrieval of the first data version and/or the at least second data version; and one or more instructions for implementing communication access by one or more parties and/or the designated user via a communication type that is correlated with the first data version and/or the at least second data version. In addition to the foregoing, other computer program product aspects are described in the claims, drawings, and text forming a part of the present application.

In a further aspect, a method for media coordination includes but is not limited to transmitting a first data version of the multimedia data based on a particular media format to a storage facility; receiving from the storage facility a conversion reference identifying the first data version, the conversion reference identifying at least a second data version of the multimedia data; receiving a cross-reference between the first data version and the at least second data version to enable coordinated user or device management of the first data version and the another data version type; and implementing communication access by one or more parties and/or the designated user via a communication type that is correlated with the first data version and/or the at least second data version.

In another aspect, a computer program product includes but is not limited to a signal bearing medium bearing at least one or more instructions for transmitting a first data version of the multimedia data based on a particular media format to a storage facility; one or more instructions for receiving from the storage facility a conversion reference identifying the first data version, the conversion reference identifying at least a second data version of the multimedia data; one or more instructions for receiving a cross-reference between the first data version and the at least second data version to enable coordinated user or device management of the first data version and the another data version type; and one or more instructions for implementing communication access by one or more parties and/or the designated user via a communication type that is correlated with the first data version and/or the at least second data version.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a media system for one or more types of media includes but is not limited to a processor; a memory coupled to the processor; and a media engine coupled to the processor, the media engine configured to integrate a first data version of specified content with at least a second data version of related content; the media engine including a data store configured to store the first data version of specified content based on a particular media format and the at least second data version of related content based on a different media format, a reference module configured to provide a cross-reference between the first data version and the at least second data version to enable search and possible retrieval of the first data version and/or the at least second data version, and an access module configured to enable communication access by one or more parties and/or a designated user via a communication type that is correlated via at least the cross reference with the first data version and/or the at least second data version. In addition to the foregoing, other media system aspects for integrating one or more types of media are described in the claims, drawings, and text forming a part of the present application.

In another aspect, a storage system for coordinating one or more types of media includes but is not limited to a processor; a memory coupled to the processor; a transceiver coupled to the processor, the transceiver configured to generate a responsive data packet using a media type appropriate for a recipient device; and a media engine coupled to the processor, the media engine configured to integrate one or more types of media, the media engine including: a data store module configured to store one or more different format versions of a received data packet; and a conversion module coupled to the processor, the conversion module configured to convert a first data version of specified content based on a particular media format to at least a second version of related content based on a different media format, wherein the conversion module provides a conversion reference to enable coordinated management of the first data version and the at least second data version without regard to media type. In addition to the foregoing, other media system aspects for integrating one or more types of media are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 6A and 6B illustrate a flow diagram of exemplary method features in accordance with various embodiments of the subject matter of the present application.

FIGS. 6C and 6D illustrate a flow diagram of exemplary method features in accordance with additional embodiments of the subject matter of the present application.

FIG. 7A and 7B illustrate a flow diagram of exemplary method features in accordance with further embodiments of the subject matter of the present application.

DETAILED DESCRIPTION

Figure 1:
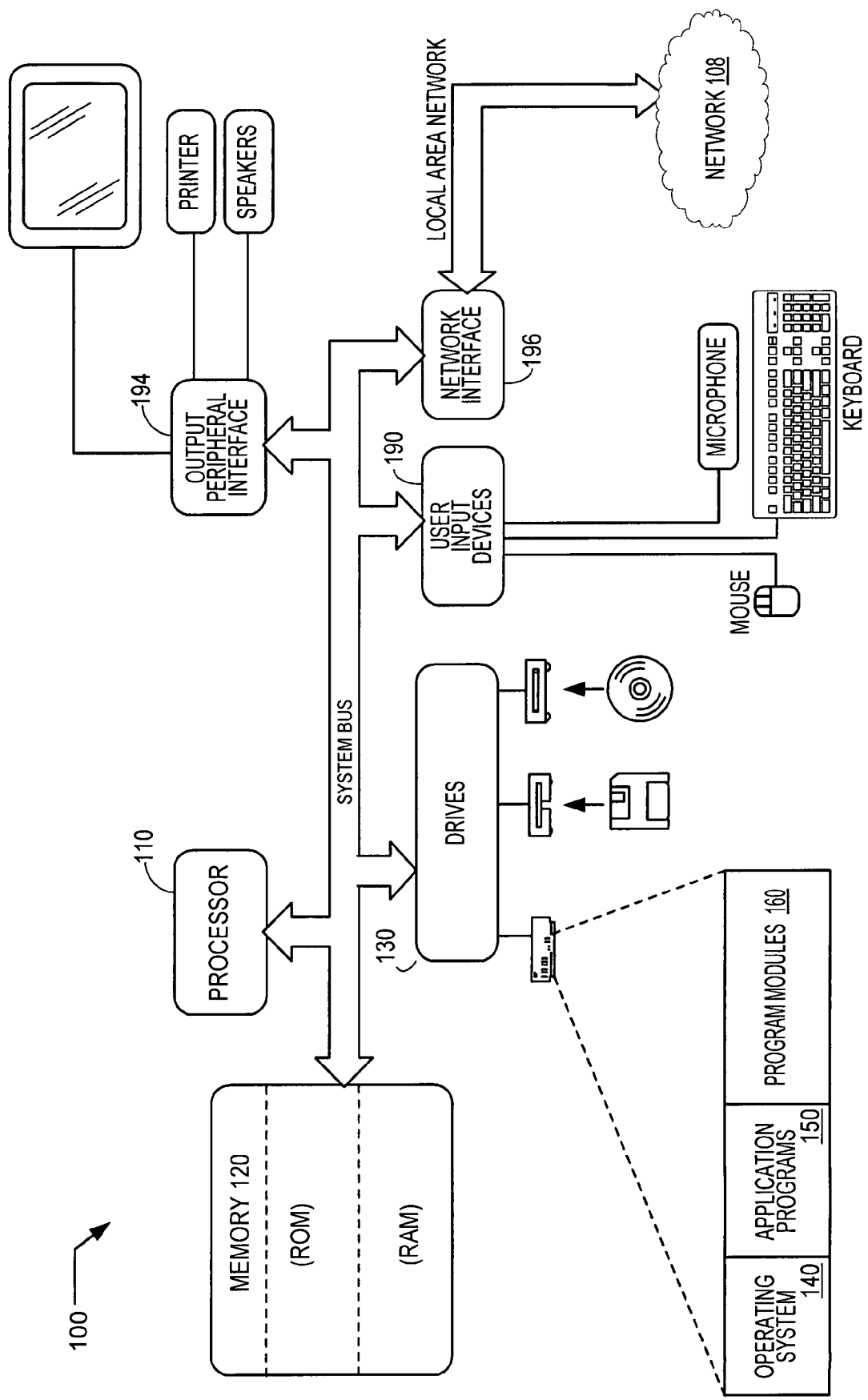
FIG. 1 is a block diagram of an exemplary computer architecture that supports the claimed subject matter of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, and program modules 160. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 is connected in a networking environment such that processor 110 and/or program modules 160 can perform with or as a cross-media storage system with a media engine capable of instantiating a conversion module and/or logging module in accordance with embodiments herein.

Figure 2:
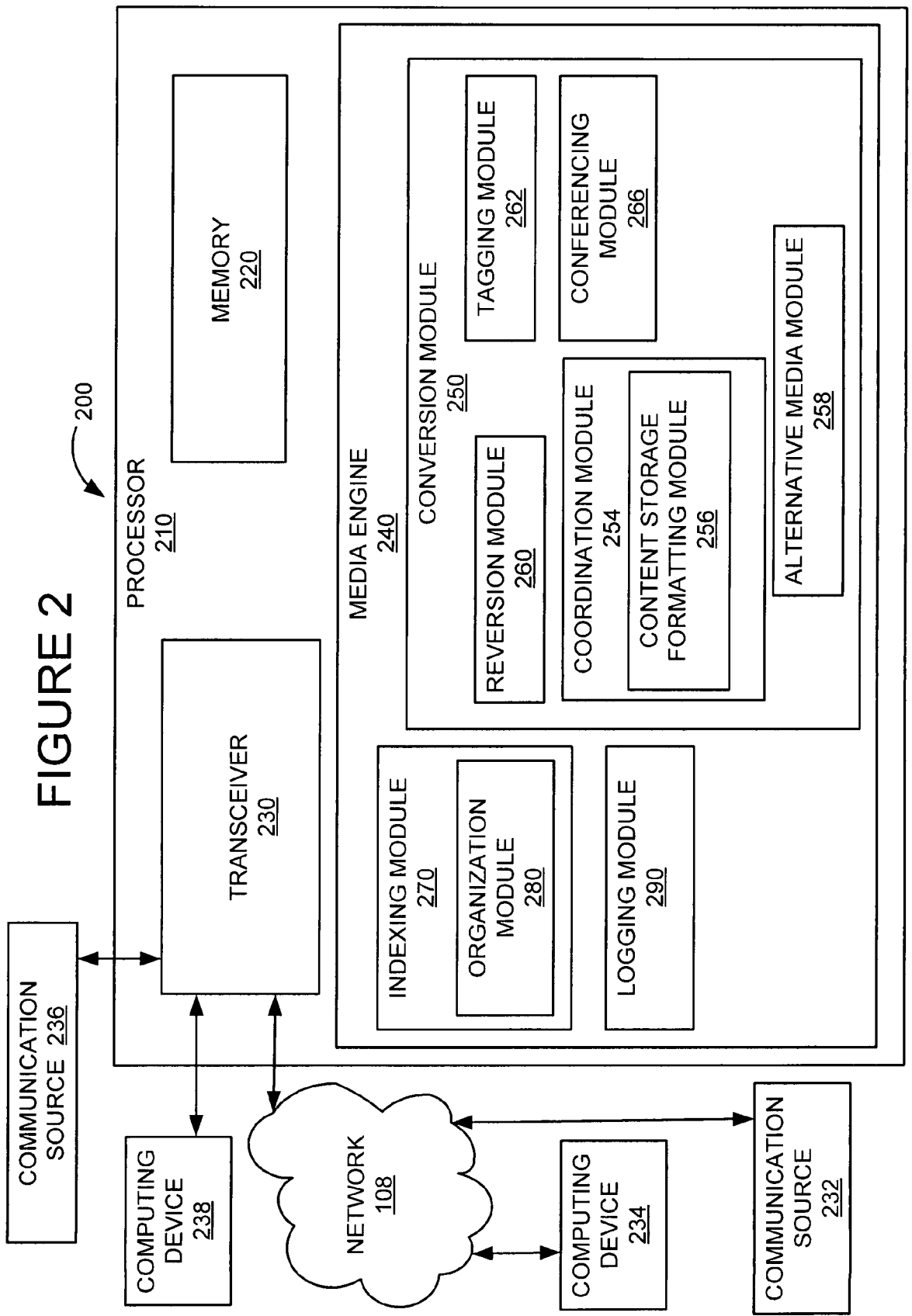
FIG. 2 is a block diagram of an exemplary system that supports the claimed subject matter of the present application.

Referring now to FIG. 2, illustrated is an exemplary block diagram for an embodiment of a cross-media communication coordination system 200. As shown, the illustrated media system 200 includes a processor 210, a memory 220, coupled to the processor 210. FIG. 2 also illustrates a transceiver 230 which can be configured to send a receive data packets in different formats, and send and receive one or more data packets holding the one or more types of media. Transceiver 230 can be configured to interface with various modes of communication (e.g., communication links) to send and receive data packets holding one or more types of media. FIG. 2 also illustrates media engine 240 accessible by processor 210 and by network 108 (see FIG. 1). Such accessibility to the media engine 240 may be provided through a communication link via network 108 to a communication source 232, as well as to one or more computing devices 234 (e.g., personal communication device, mobile device, etc.) capable of receiving a responsive type of media communication in a suitable format. In some implementations such accessibility to the media engine 240 may include a more direct (e.g., non-network) communication link to a communication source 236, as well as to one or more computing devices 238 capable of receiving a responsive type of media communication in a suitable format. It will be understood that in some implementations the communication source 232, 236 may also be a destination computing device for a responsive type of media communication. The exemplary media engine 240 may be configured to integrate, manipulate, modify, identify and/or store one or more types of media.

FIG. 2 further illustrates exemplary components within media engine 240. For example, media engine 240 includes modules, some or all of which can be implemented as program modules 160, as shown in FIG. 1. Specifically, FIG. 2 illustrates a conversion module 250 disposed within media engine 240. Disposed within conversion module 250 are several modules including reversion module 260, tagging module 262, conferencing module 266, alternative media module 258 and coordination module 254. Coordination module further illustrates a content storage formatting module 256 disposed within coordination module 254. Also disposed within media engine 240 is indexing module 270 and logging module 290. Indexing module 270 illustrates an organization module 280 disposed within indexing module 270.

Conversion module 250 can be configured to convert one or more received data packets to a standardized data format. A standardized data format can include a format according to an accepted standard in an industry and/or a proprietary standard data format and/or a data format that is considered a standard for particular purpose, a particular industry, and/or a particular time period. Conversion module 250 can be configured to convert received data packets to an SGML-based data format and/or an ASCII-based text format. Conversion module 250 can also be configured for converting the one or more received data packets by removing data packet envelopes around core data packets. Reversion module 260 can be configured to enable a user of a computing device to respond to a data packet in a predetermined media type.

Indexing module 270 can be configured to receive one or more data packets in a standardized data format and index the data packets to enable a search of the one or more data packets in a standardized data format. Logging module 290 can be coupled to the processor and configured to log the one or more received data packets. In one embodiment, logging module 290 can operate on either a converted or an original media type to enable manipulation of the received one or more data packets without regard to media type of the received one or more data packets. The logging module 290 can also be configured as a database for storing data packets as will be appreciated by one of skill in the art with the benefit of the present disclosure.

Organization module 280, shown disposed within indexing module 270, can be configured to receive data packets in the standardized data format and index the one or more data packets according to one or more of content, subject matter of data packets, media type, and source of the one or more data packets destination. Like logging module 290, organization module can also be configured as a database according to system requirements. Depending on the type of data packets received, and the necessity thereof, some data packets can be appropriate for storing while others could be temporary type data packets.

In one embodiment, conversion module 250 further includes a coordination module 254. Coordination module 254 can be configured to convert the one or more received data packets and/or a selected subset of the one or more received data packets to enable a user of the computing device to communicate using a predetermined media type. In one embodiment, coordination module 254 is configured to include a content storage formatting module 256. Content storage formatting module 256 can be configured for converting received data packets and/or a selected subset of the received data packets to a specified content storage format appropriate for including in a further communication to a predetermined computing device.

In another embodiment, conversion module 250 includes alternative media module 258. Alternative media module 258 can be configured to convert the received data packets to a standardized media type for purposes of sending selected data packets to a conference group, to a sender, a mobile device, an archive, and/or to an output device. In one embodiment, alternative media module 258 is further configured for converting the received data packets from an original media type to a media type appropriate for enabling a conference with one or more media types, which could include a simple text format, a visual format, a non-English language format, and/or a voice only format.

In one embodiment, conversion module 250 is coupled to indexing module 270 such that indexing module 270 indexes received data packets according to the alternative media type, which can be determined via alternative media module 258, and/or a target destination for the received data packets.

Conversion module 250 further includes a tagging module 262. Tagging module 262 can be configured to create a conversion tag to enable a recipient server to convert a responsive data packet to the original media type or to another appropriate media type.

In one embodiment, conversion module 250 can include a conferencing module 258 configured for enabling a conference with multiple forms of media types. For example, the media types in the conference can include image data and/or voice data and/or video and/or text data, and the conferencing module can be configured to enable conferencing with parties using a plurality of media types.

It will be understood that the illustrated system embodiments of FIGS. 1-2 are provide by way of example only, and are not intended to be limiting. Furthermore, it will be understood that the various process features and system components disclosed herein may be incorporated in different embodiment combinations depending on the circumstances.

Referring now to FIGS. 3A, 3B and 3C and 3D, an exemplary flow diagram illustrates the operation of various aspects of a cross-media communication coordination system in accordance with different embodiments.

Figure 3A:
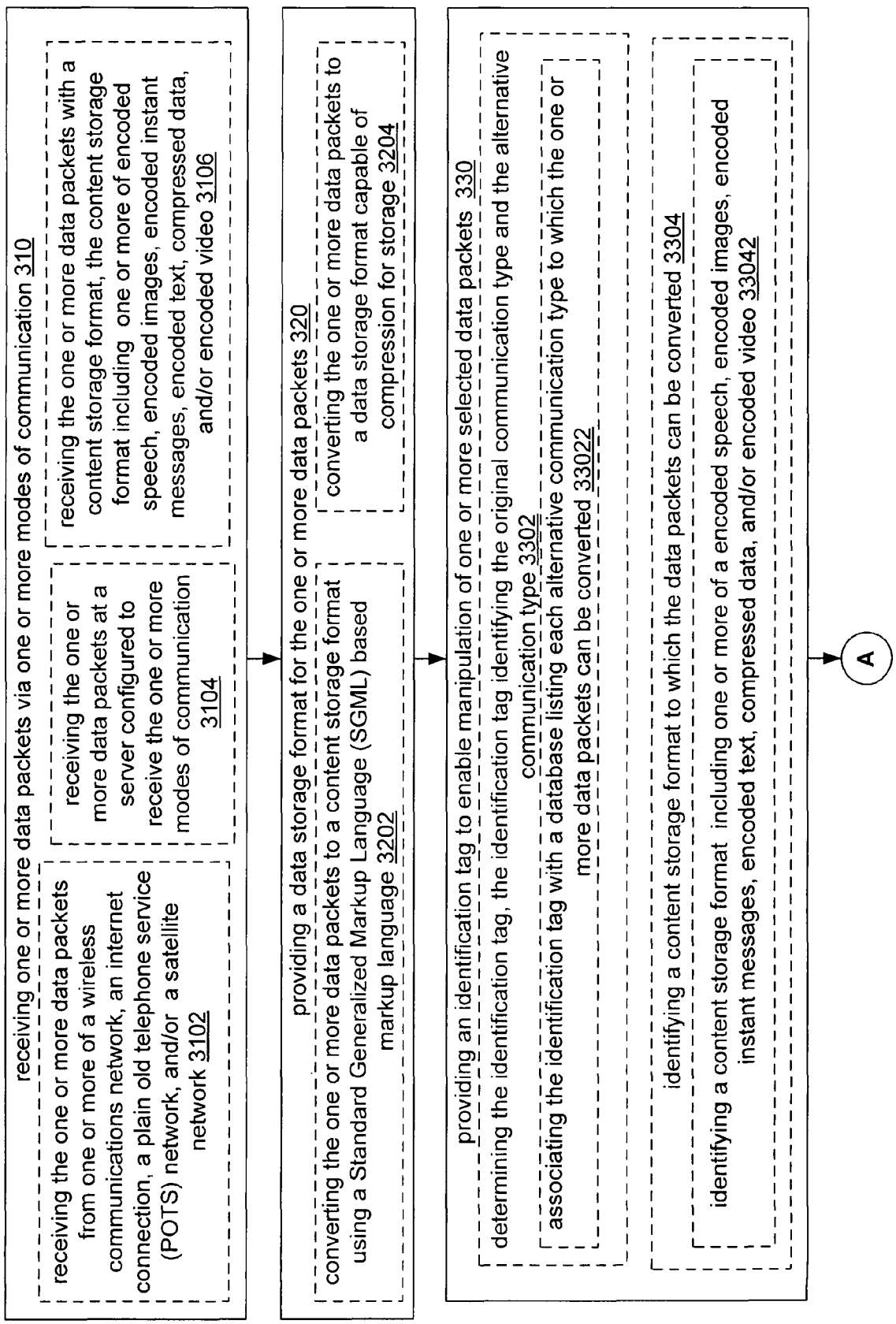
FIGS. 3A and 3B illustrate a flow diagram of exemplary method features in accordance with various embodiments of the subject matter of the present application.

As illustrated in FIG. 3A, block 310 provides for receiving one or more data packets via one or more modes of communication (e.g., cross-media communication coordination system 200 receiving data packets via network 108). Depicted within block 310 is optional block 3102, which provides for receiving the one or more data packets from one or more of a wireless communications network, an internet connection, a plain old telephone service (POTS) network, and/or a satellite network (e.g., cross-media communication coordination system 200 receiving one or more data packets via network 108 wherein network 108 is a wireless network, internet, phone service or satellite network). As will be appreciated, the data packets can be received over many different types of communications networks and be of vastly different types of media when received at media engine 240.

Depicted within block 310 is optional block 3104, which provides for receiving the one or more data packets at a server configured to receive the one or more modes of communication (e.g., cross-media communication coordination system 200 receiving the data packets at a server such as computer system 100 configured to receive different types of media communication via network 108). The server can be a computer system 100 or other appropriately configured server that receives digital data and is able to parse the data packets into appropriate parts for later conversion, if necessary.

Depicted within block 310 is optional block 3106, which provides for receiving the one or more data packets with a content storage format, the content storage format including one or more of encoded speech, encoded images, encoded instant messages, encoded text, compressed data, and/or encoded video (e.g., cross-media communication coordination system 200 receiving the data packets as different types of media communication via network 108 as encoded speech, encoded images, encoded instant messages, encoded text, compressed data, and/or encoded video). Block 320 illustrates an aspect for providing a data storage format for the one or more data packets (e.g., conversion module 250 converting the data packets into a data storage format to enable storing the data packets).

Depicted within block 320 is optional block 3202, which provides for converting the one or more data packets to a content storage format using a Standard Generalized Markup Language (SGML) based markup language (e.g., conversion module 250 converting received data packets to SGML). For example, the converting data packets can be to SGML to enable a reduced data format, such as a data format appropriate for smart card usage, wireless phone usage, or another hypertext format.

Also depicted within block 320 is optional block 3204, which provides for converting the one or more data packets to a data storage format capable of compression for storage.

Block 330 provides for providing an identification tag to enable manipulation of one or more selected data packets (e.g., tagging module 262 and/or logging module 290 providing an identification tag for enabling manipulation of the data packets). Disposed within block 330 is optional block 3302, which provides for determining the identification tag, the identification tag identifying the original communication type and the alternative communication type (e.g., tagging module 262 determining the identification tag according to communication type, which can include an original communication type and/or the alternative communication type). Disposed within optional block 3302 is optional block 33022 which provides for associating the identification tag with a database listing each alternative communication type to which the one or more data packets can be converted (e.g., tagging module 262 and/or logging module 290 associating the identification tag with a database within media engine 240).

Block 330 further provides in optional block 3304 for identifying a content storage format to which the data packets can be converted (e.g., content storage formatting module 256 identifying a content storage format to which the data packets can be converted). Disposed within optional block 3304 is optional block 33042, which provides for identifying a content storage format including one or more of a encoded speech, encoded images, encoded instant messages, encoded text, compressed data, and/or encoded video (e.g., content storage formatting module determining whether a content storage format should include encoded speech, encoded images, encoded instant messages, encoded text, compressed data, and/or encoded video).

Figure 3B:
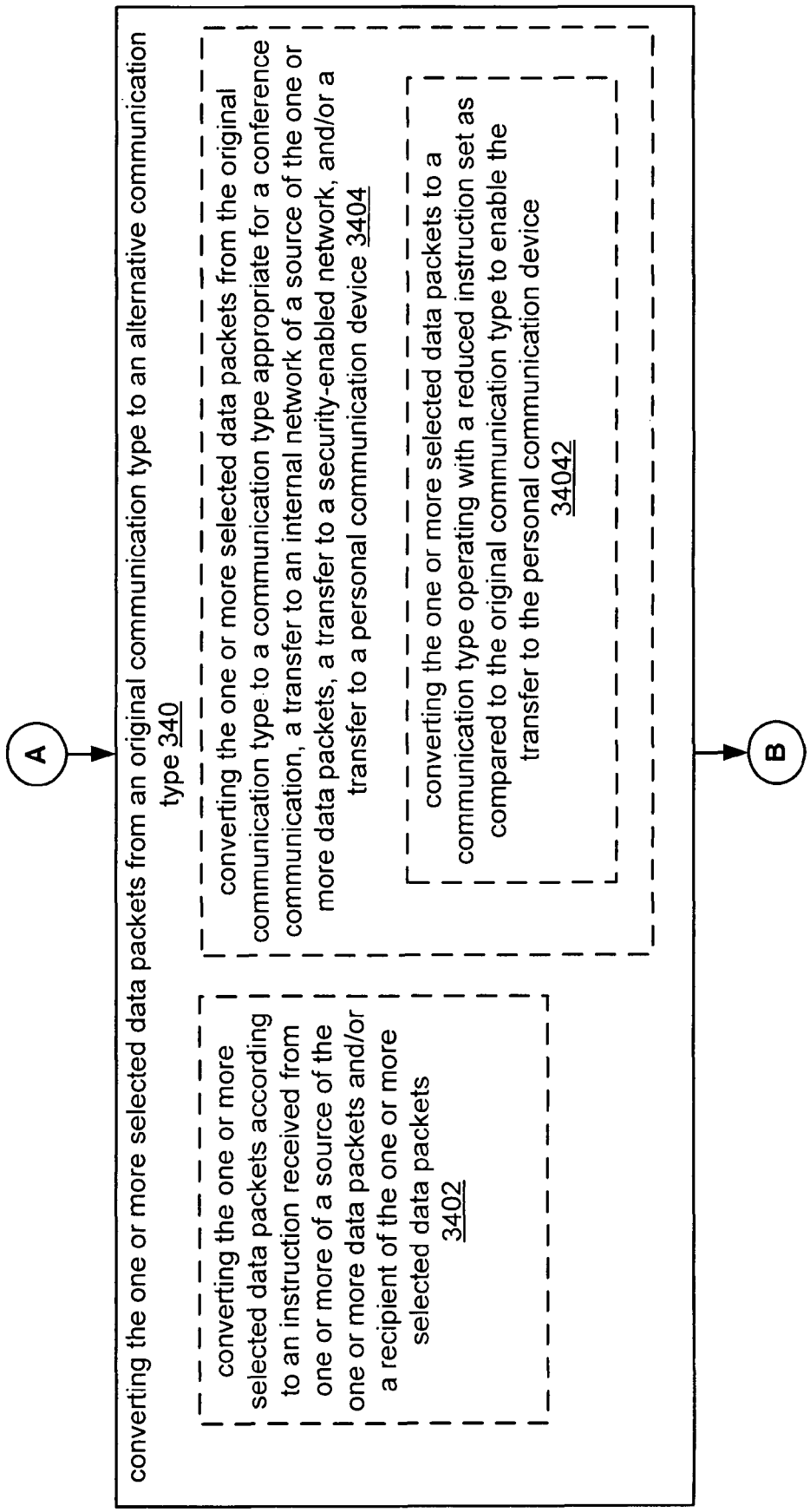

Referring now to FIG. 3B, the exemplary method flow diagram continues with block 340. More specifically, block 340 provides for converting the one or more selected data packets from an original communication type to an alternative communication type (e.g., conversion module 250 converting the one or more selected data packets from an original media type to an alternative media type). Disposed within block 340 is optional block 3402 which provides for converting the one or more selected data packets according to an instruction received from one or more of a source of the one or more data packets and/or a recipient of the one or more selected data packets (e.g., conversion module 250 converting the one or more selected data packets according to a received instruction from a source over network 108 or a recipient over network 108). Also disposed within block 340 is optional block 3404, which provides for converting the one or more selected data packets from the original communication type to a communication type appropriate for a conference communication, a transfer to an internal network of a source of the one or more data packets, a transfer to a security-enabled network, and/or a transfer to a personal communication device (e.g., conversion module 250 converting the selected data packets from the original communication via conferencing module 266 to a conference communication type or conversion module 250 converting the selected data packets for purposes of a transfer to an internal network via network interface 196, or for purposes of a transfer over network 108 and/or to a personal communication device). Disposed within optional block 3404 is optional block 34042 which provides for converting the one or more selected data packets to a communication type operating with a reduced instruction set as compared to the original communication type to enable the transfer to the personal communication device (e.g., conversion module 250 converting the selected data packets to a communication type that uses a reduced instruction set appropriate for a personal communication device).

Figure 3C:
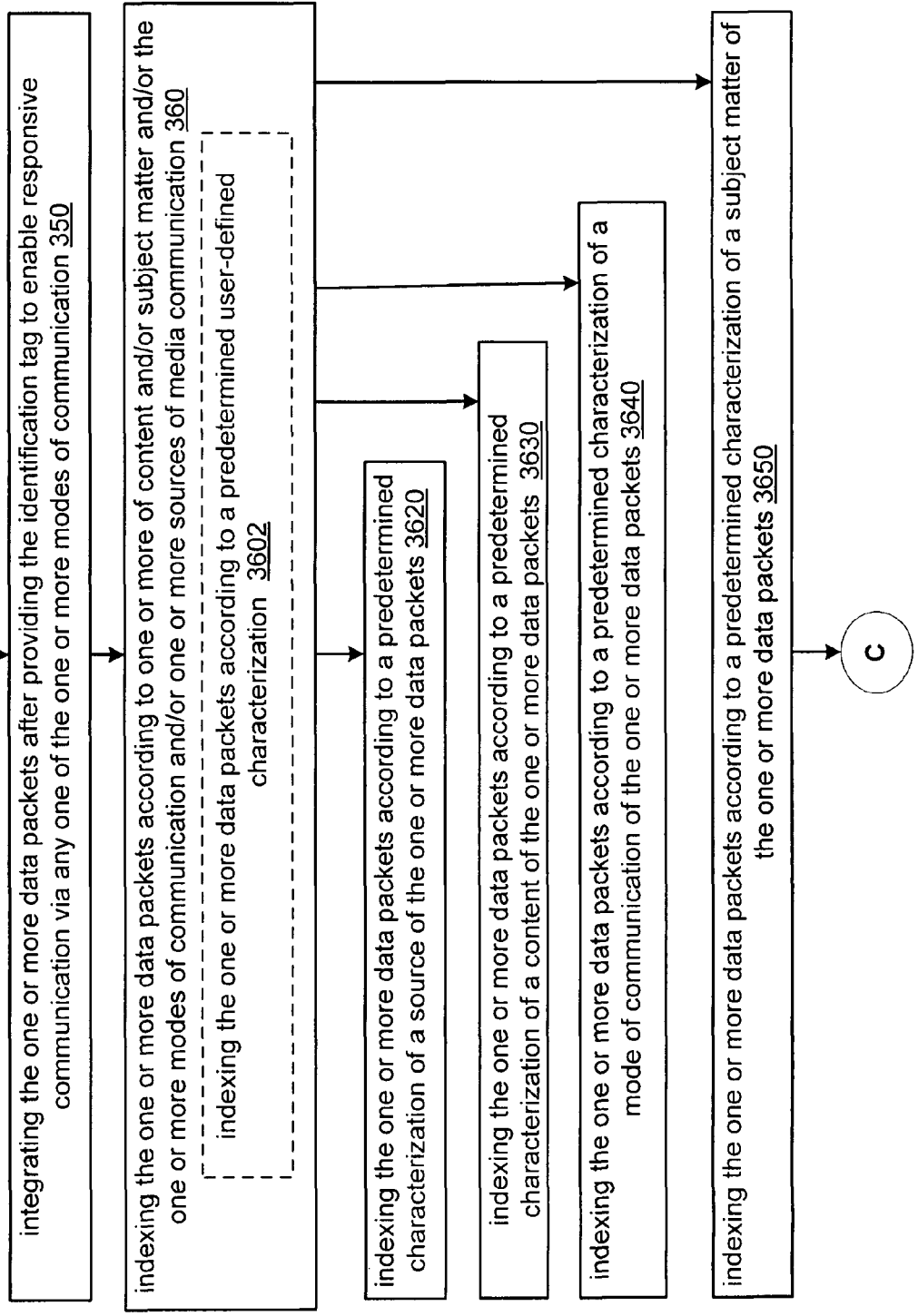
FIGS. 3C and 3D illustrate a flow diagram of exemplary method features in accordance with additional embodiments of the subject matter of the present application.

Referring now to FIG. 3C, the exemplary flow diagram continues with a further possible feature depicted in block 350. Block 350 provides for integrating the one or more data packets after providing the identification tag to enable responsive communication via any one of the one or more modes of communication (e.g., conversion module 250 converting the data packets and then integrating the logged and converted data packets into an outgoing communication over network 108).

Another possible feature depicted in block 360 provides for indexing the one or more data packets according to one or more of content and/or subject matter and/or the one or more modes of communication and/or one or more sources of media communication (e.g., indexing module 270 indexing logged data packets logged via logging module 290 according to a subject matter of the data or according the type of media communication or source of media communication). Depicted within block 360 is optional block 3602 which provides for indexing the one or more data packets according to a predetermined user-defined characterization (e.g., indexing module 270 indexing packets previously converted in conversion module 250 and/or logged in logging module 290 according to a predetermined user-defined characterization).

In different embodiments, indexing can be performed according to different predetermined characterizations in accordance with system requirements and/or user requirements. Thus, the exemplary flow diagram of FIG. 3C continues with block 3620, 3630, 3640 and 3650 which provide for various different possible indexing methods which may be provided separately or in combination in no particular order. Specifically, block 3620 provides for indexing the one or more data packets according to a predetermined characterization of a source of the one or more data packets (e.g., indexing module 270 indexing the data packets according to a predetermined characterization of a source of the data packets). Block 3620 is followed by block 3630 which provides for indexing the one or more data packets according to a predetermined characterization of a content of the one or more data packets (e.g., indexing module 270 indexing the data packets according to a predetermined characterization of the content within the data packets). Block 3640 provides for indexing the one or more data packets according to a predetermined characterization of a mode of communication of the one or more data packets (e.g., indexing module 270 indexing the data packets according to a predetermined characterization of a mode of communication of the data packets). The modes of communication can include Internet communication, wireless communication, radio frequency communication, satellite communication and other modes of communication. Block 3650 provides for indexing the one or more data packets according to a predetermined characterization of a subject matter of the one or more data packets (e.g., indexing module 270 indexing the data packets according to a predetermined characterization of subject matter of the data packets, including indexing according to topic of the data packets, metadata describing the data in the data packets, a description of the subject matter from an outside source describing the data packet subject matter and the like). In one embodiment, indexing module 270 or another program module determines a file extension of data within the data packet to enable indexing. For example, indexing can determine whether the data packets contain .jpg files, .wav files, .mp3 files, .doc files, .xml files and the like.

Figure 3D:
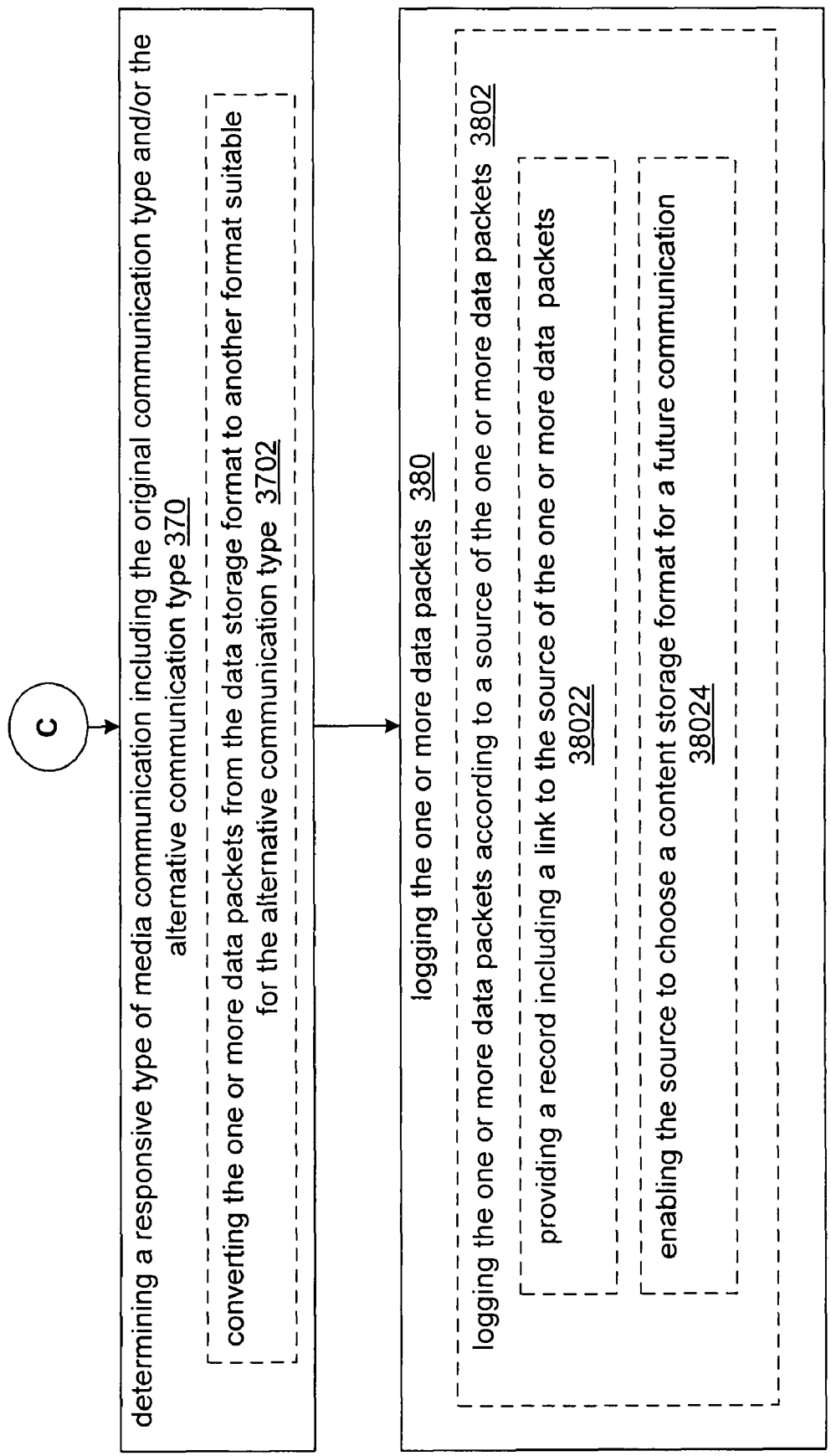

Referring now to FIG. 3D, the exemplary flow diagram continues with a further possible feature depicted in block 370. Block 370 provides for determining a responsive type of media communication including the original communication type and/or the alternative communication type (e.g., transceiver determining a responsive type of communication based on a received communication over network 108). Disposed within block 370 is optional block 3702 which provides for converting the one or more data packets from the data storage format to another format suitable for the alternative communication type (e.g., conversion module 250 converting the data packets from a data storage format for storing the data to a responsive type of media communication for transmittal over network 108).

The exemplary flow diagram of FIG. 3D continues with another possible feature depicted in block 380. Block 380 provides for logging the one or more data packets (e.g., logging module 290 logging the data packets received over network 108 and/or from within computer system 100). Disposed within block 380 is optional block 3802 which provides for logging the one or more data packets according to a source of the one or more data packets (e.g., logging module 290 logging the data packets received over network 108 and/or from within computer 100). Additional possible features depicted in blocks 38022 and block 38024 are illustrated within block 3802. Specifically, optional block 38022 provides for providing a record including a link to the source of the one or more data packets (e.g., logging module 290 logging the data packets and providing a record of the log wherein the record includes a link, such as an internet address or internal address to a source of the data packets). Optional block 38024 provides for enabling the source to choose a content storage format for a future communication (e.g., sending the source of the data packets an email or other communication or accepting the data packets conditionally upon a designation of a preferred content storage format for future communication).

Figure 4:
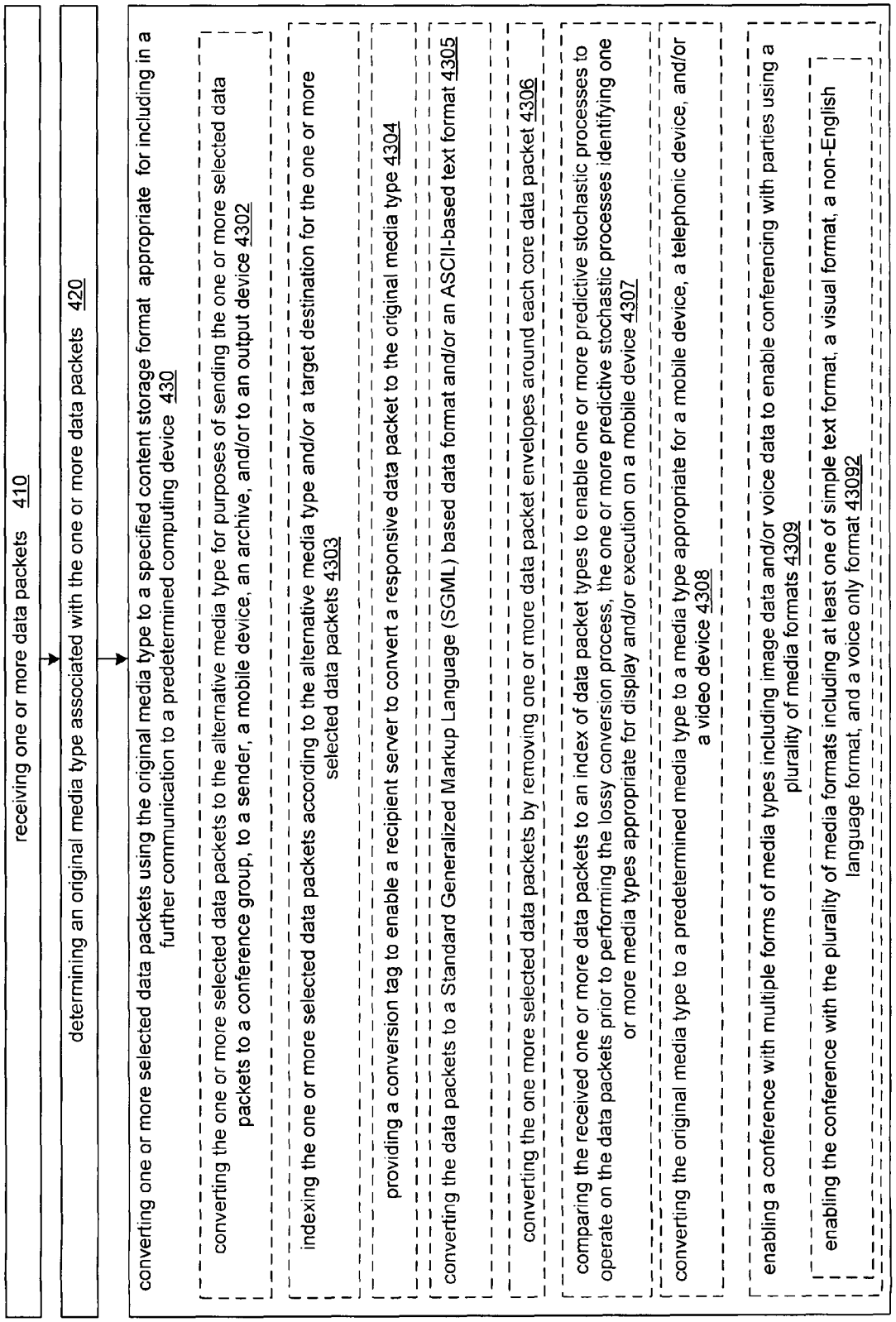
FIG. 4 illustrates a flow diagram of exemplary method features in accordance with further embodiments of the subject matter of the present application.

Referring now to FIG. 4, an exemplary flow diagram illustrates another method embodiment that includes various possible features for providing cross-media communication coordination.

Specifically referring to FIG. 4, block 410 provides for receiving one or more data packets (e.g., cross-media communication system 200 receiving data packets over network 108). Block 420 provides for determining an original media type associated with the one or more data packets (e.g., transceiver 240 and/or conversion module 250 determining an original media type of the data packets).

Block 430 provides for converting one or more selected data packets using the original media type to a specified content storage format appropriate for including in a further communication to a predetermined computing device (e.g., conversion module 250 converting the original media type to a predetermined media type for sending over network 108 according to a computing device determined to be connected to network 108). Depicted within block 430 is optional block 4302, which provides for converting the one or more selected data packets to the alternative media type for purposes of sending the one or more selected data packets to a conference group, to a sender, a mobile device, an archive, and/or to an output device (e.g., conversion module 250 converting the original media type to an alternative media type for purposes of sending selected data packets to any of a number of media formats).

Also depicted with in block 430 is optional block 4303, which provides for indexing the one or more selected data packets according to the alternative media type and/or a target destination for the one or more selected data packets (e.g., indexing module 270 indexing the one or more selected data packets according to the alternative media type and/or a target destination for the one or more selected data packets).

Further depicted within block 430 is optional block 4304, which provides for providing a conversion tag to enable a recipient server to convert a responsive data packet to the original media type (e.g., conversion module 250 providing a conversion tag to enable a recipient server to convert responsive data back to an original media type).

Block 430 further depicts optional block 4305, which provides for converting the data packets to a Standard Generalized Markup Language (SGML) based data format and/or an ASCII-based text format (e.g., conversion module 250 converting data packets to an SGML-based format or an ASCII text format).

Block 430 further depicts optional block 4306, which provides for converting the one more selected data packets by removing one or more data packet envelopes around each core data packet (e.g., conversion module 250 converting data packets by removing envelopes around each core of a data packet).

Block 430 further depicts optional block 4307, which provides for comparing the received one or more data packets to an index of data packet types to enable one or more predictive stochastic processes to operate on the data packets prior to performing a lossy conversion process, the one or more predictive stochastic processes identifying one or more media types appropriate for display and/or execution on a mobile device (e.g., media engine 240 and processor 210 operating with conversion module 250 to compare received data packets to an index determined by indexing module 270 to enable one or more predictive stochastic processes to operate on the data packet prior to performing a lossy conversion process, the one or more predictive stochastic processes identifying one or more media types appropriate for display and/or execution on a mobile device).

Block 430 also depicts optional block 4308 which provides for converting the original media type to a predetermined media type to a media type appropriate for a mobile device, a telephonic device, and/or a video device (e.g., conversion module 250 converting an original media type to a predetermined media type to media type for a mobile device, telephone, and/or video device).

Block 430 further depicts optional block 4309, which provides for enabling a conference with multiple forms of media types including image data and/or voice data to enable conferencing with parties using a plurality of media formats (e.g., media engine 240 enabling a teleconference over network 108 with multiple forms of media types via conversion module 250 including image data and/or voice data to enable conferencing with parties using a plurality of media formats). Depicted within optional block 4309 is illustrated optional block 43092 which provides for enabling the conference with the plurality of media formats including at least one of simple text format, a visual format, a non-English language format, and a voice only format (e.g., conversion module 250 enabling the conference to take place with the plurality of media formats including at least one of simple text format, a visual format, a non-English language format, and a voice only format).

Figure 5:
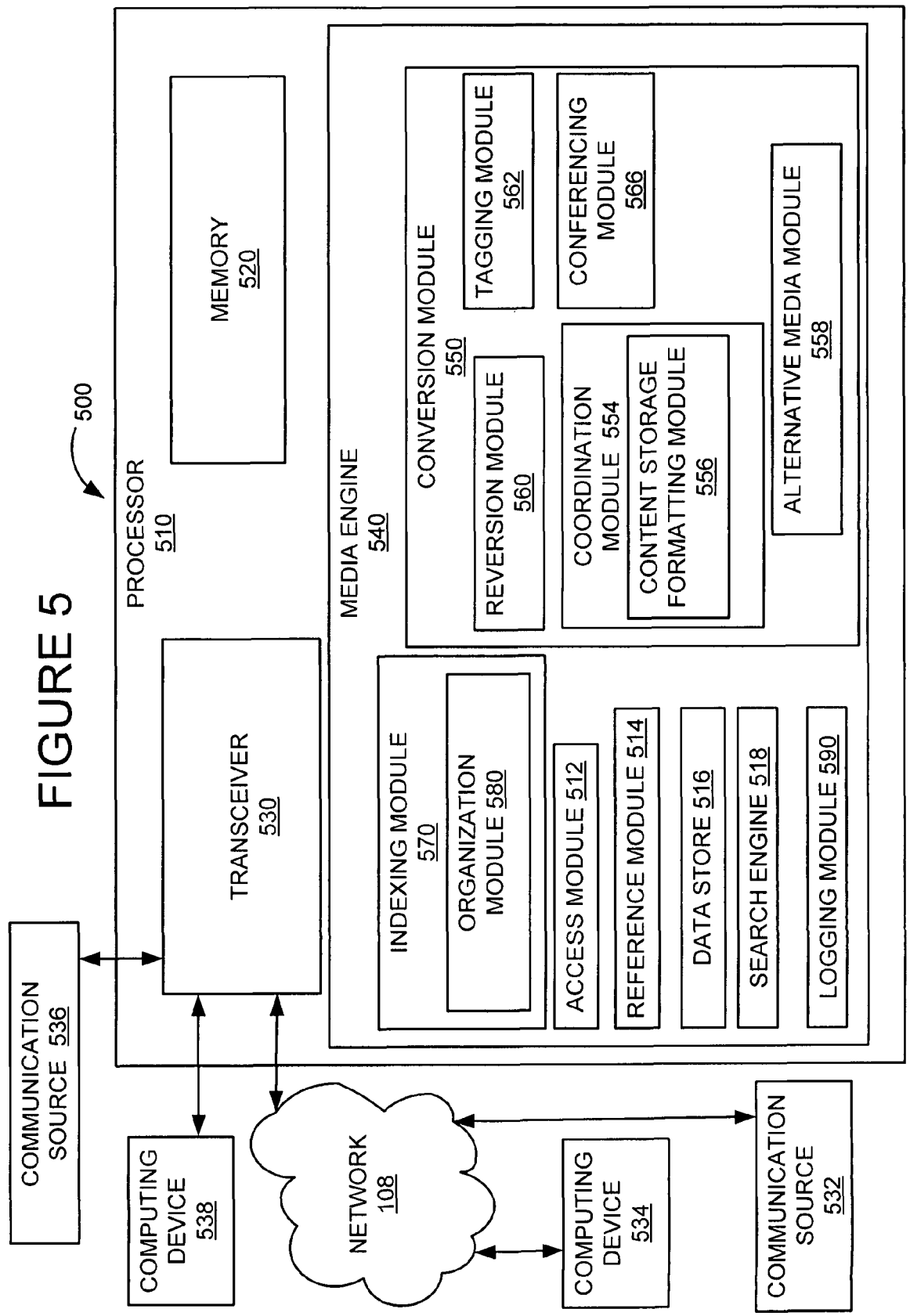
FIG. 5 is a block diagram of another exemplary system that supports the claimed subject matter of the present application.

Referring now to FIG. 5, illustrated is an exemplary block diagram for an embodiment of a cross-media storage coordination system 500. As shown, the illustrated media system 500 includes a processor 510 and a memory 520, coupled to the processor 510. FIG. 5 also illustrates a transceiver 530 which can be configured to send a receive data packets in different formats, and send and receive one or more data packets holding the one or more types of media. Transceiver 530 can be configured to interface with various modes of communication (e.g., communication links) to send and receive data packets holding one or more types of media. FIG. 5 also illustrates media engine 540 accessible by processor 510 and by network 108 (see FIG. 1). Such accessibility to the media engine 540 may be provided through a communication link via network 108 to a communication source 532 as well as to one or more computing devices 534 via network 108, (e.g., personal communication device, mobile device, etc.) capable of receiving a responsive type of media communication in a suitable format. In some implementations such accessibility to the media engine 540 may include a more direct (e.g., non-network) communication link to a communication source 536, as well as to one or more computing devices 538 capable of receiving a responsive type of media communication in a suitable format. It will be understood that in some implementations the communication source 532, 536 may also be a destination computing device for a responsive type of media communication. The exemplary media engine 540 may be configured to integrate, manipulate, modify, identify and/or store one or more types of media.

FIG. 5 further illustrates exemplary components within media engine 540. For example, media engine 540 includes modules, some or all of which can be implemented as program modules 160, as shown in FIG. 1. Specifically, FIG. 5 illustrates an access module 512, a reference module 514, a data store 516, a search engine 518, logging module 590, an indexing module 570 and a conversion module 550 disposed within media engine 540. Access module 512 can be configured to operate with transceiver 530 to manage access to data packets and data versions stored or received by media engine 540 and/or stored in data store 516. Search engine 518 can be coupled to data store 516 to provide search capabilities to search data packets and versions of data processed by processor 510. Reference module 514 can be configured to provide a cross-reference for media storage purposes.

Disposed within conversion module 550 are several modules including reversion module 560, tagging module 562, conferencing module 566, alternative media module 558 and coordination module 554. Coordination module illustrates a content storage formatting module 556 disposed within coordination module 554. Indexing module 570 illustrates an organization module 580 disposed within indexing module 570.

Conversion module 550 can be configured to convert one or more received data packets to a standardized data format. A standardized data format can include a format according to an accepted standard in an industry and/or a proprietary standard data format and/or a data format that is considered a standard for particular purpose, a particular industry, and/or a particular time period. Conversion module 550 can be configured to convert received data packets to an SGML-based data format and/or an ASCII-based text format. Conversion module 550 can also be configured for converting the one or more received data packets by removing data packet envelopes around core data packets. Reversion module 560 can be configured to enable a user of a computing device to respond to a data packet in a predetermined media type.

Indexing module 570 can be configured to receive one or more data packets in a standardized data format and index the data packets to enable a search of the one or more data packets in a standardized data format. Logging module 590 can be coupled to the processor and configured to log the one or more received data packets. In one embodiment, logging module 590 can operate on either a converted or an original media type to enable manipulation of the received one or more data packets without regard to media type of the received one or more data packets. The logging module 590 can also be configured as a database for storing data packets as will be appreciated by one of skill in the art with the benefit of the present disclosure.

Organization module 580, shown disposed within indexing module 570, can be configured to receive data packets in the standardized data format and index the one or more data packets according to one or more of content, subject matter of data packets, media type, and source of the one or more data packets destination. Like logging module 590, organization module can also be configured as a database according to system requirements. Depending on the type of data packets received, and the necessity thereof, some data packets can be appropriate for storing while others could be temporary type data packets.

In one embodiment, conversion module 550 further includes a coordination module 554. In one embodiment, coordination module 554 is configured to include a content storage formatting module 556. Content storage formatting module 556 can be configured for converting received data packets and/or a selected subset of the received data packets to a specified content storage format appropriate for including in a further communication to a predetermined computing device.

In another embodiment, conversion module 550 includes alternative media module 558. Alternative media module 558 can be configured to convert the received data packets to a standardized media type for purposes of sending selected data packets to a conference group, to a sender, a mobile device, an archive, and/or to an output device. In one embodiment, alternative media module 558 is further configured for converting the received data packets from an original media type to a media type appropriate for enabling a conference with one or more media types, which could include a simple text format, a visual format, a non-English language format, and/or a voice only format.

In one embodiment, conversion module 550 is coupled to indexing module 570 such that indexing module 570 indexes received data packets according to the alternative media type, which can be determined via alternative media module 558, and/or a target destination for the received data packets.

Conversion module 550 further includes a tagging module 562. Tagging module 562 can be configured to create a conversion tag to enable a recipient server to convert a responsive data packet to the original media type or to another appropriate media type.

In one embodiment, conversion module 550 can include a conferencing module 558 configured for enabling a conference with multiple forms of media types. For example, the media types in the conference can include image data and/or voice data and/or video and/or text data, and the conferencing module can be configured to enable conferencing with parties using a plurality of media types.

It will be understood that the illustrated system embodiments of FIGS. 1-2 are provided by way of example only, and are not intended to be limiting. Furthermore, it will be understood that the various process features and system components disclosed herein may be incorporated in different embodiment combinations depending on the circumstances.

Referring now to FIGS. 6A, 6B, 6C and 6D, an exemplary flow diagram illustrates the operation of various aspects of a cross-media communication storage system in accordance with different embodiments.

As illustrated in FIG. 6A, block 610 provides for storing a first data version of specified content based on a particular media format (e.g., cross-media storage system 500 storing data packets in data store 516 including a first data version of specified content).

Block 620 provides for storing at least a second data version of related content based on a different media format (e.g., data store 516 storing the second data version). Depicted within block 620 is block 6202, which provides for storing at least a second data version of related content wherein the related content includes content substantially identical to the specified content of the first data version (e.g., data store 516 storing the second data version and the related content including content substantially identical to specified content of the first data version).

Block 630 provides for providing a cross-reference between the first data version and the at least second data version to enable coordinated management by a designated user and/or an approved device for search and possible retrieval of the first data version and/or the at least second data version (e.g., data store 516 providing a cross-reference via reference module 514 providing the cross-reference to enable coordinated management by a user communicating via a network 108, a communication source 532 or a computing device 534). Block 6302 for providing the cross-reference to enable user accessibility to both the first data version and the at least second data version (e.g., reference module 514 providing the cross-reference to enable a user accessibility to the data versions).

Depicted within block 6302 is illustrated block 33022, which provides for enabling selective retrieval of the first data version, or the at least second data version, or both without altering respective media formats of the first data version and/or the at least second data version (e.g. transceiver 530 providing selective retrieval of a data version stored in data store 516 and/or previously converted via conversion module 550).

Block 630 further includes block 63024, which provides for enabling selective retrieval of the first data version and/or the at least second data version after conversion to one or more alternative media formats (e.g., transceiver 530 providing selective retrieval of the first data version and/or the at least second data version after stored in data store 516 after conversion via conversion module 550 to an alternative media format).

Depicted within block 33024 is block 330242, which provides for storing the first data version and/or the at least second data version in the one or more alternative media formats (e.g., data store 516 storing a data version in an alternative format).

Also depicted within block 3302 is optional block 33026, which provides for enabling selective forwarding of the first data version and/or the at least second data version after conversion to an alternative media format (e.g., transceiver 530 forwarding a first data version or second data version after conversion module 550 converts to an alternative media format).

Also depicted within block 6302 is optional block 63028, which provides for enabling selective editing of the first data version and/or the at least second data version after conversion to an alternative media format (e.g., media engine cooperating with processor 510 to enable editing of a data version after conversion module 550 converts to an alternative media format).

Also depicted within block 6302 is optional block 63029, which provides for storing the edited version in the alternative media format (e.g., data store 516 storing the edited version in the alternative media format).

Depicted within block 630 is optional block 6304 which calls for providing the cross-reference based on subject matter of data in either the first data version and/or the at least second data version (e.g. reference module 514 providing the cross-reference based on subject matter of data in the first data version and/or the second data version).

Block 630 further includes optional block 6306, which calls for providing the cross-reference based on a source or origin of the first data version and/or the at least second data version (e.g., reference module 514 providing the cross reference based on a source or origin of the first data version and/or second data version).

Block 6308 provides for providing the cross-reference based on one of more of the following aspects of the specified content and the related content: subject matter, topic, location, time, event, photos, author, creator, owner, individual identity, group identity, predetermined characterization, metadata, date, user and statistical characteristics (e.g., media engine 540 and reference module 514 providing a cross-reference based on an aspect of specified content and/or related content subject matter, topic, location, time, event, photos, author, creator, owner, individual identity, group identity, predetermined characterization, metadata, date, user and statistical characteristics).

Figure 6B:
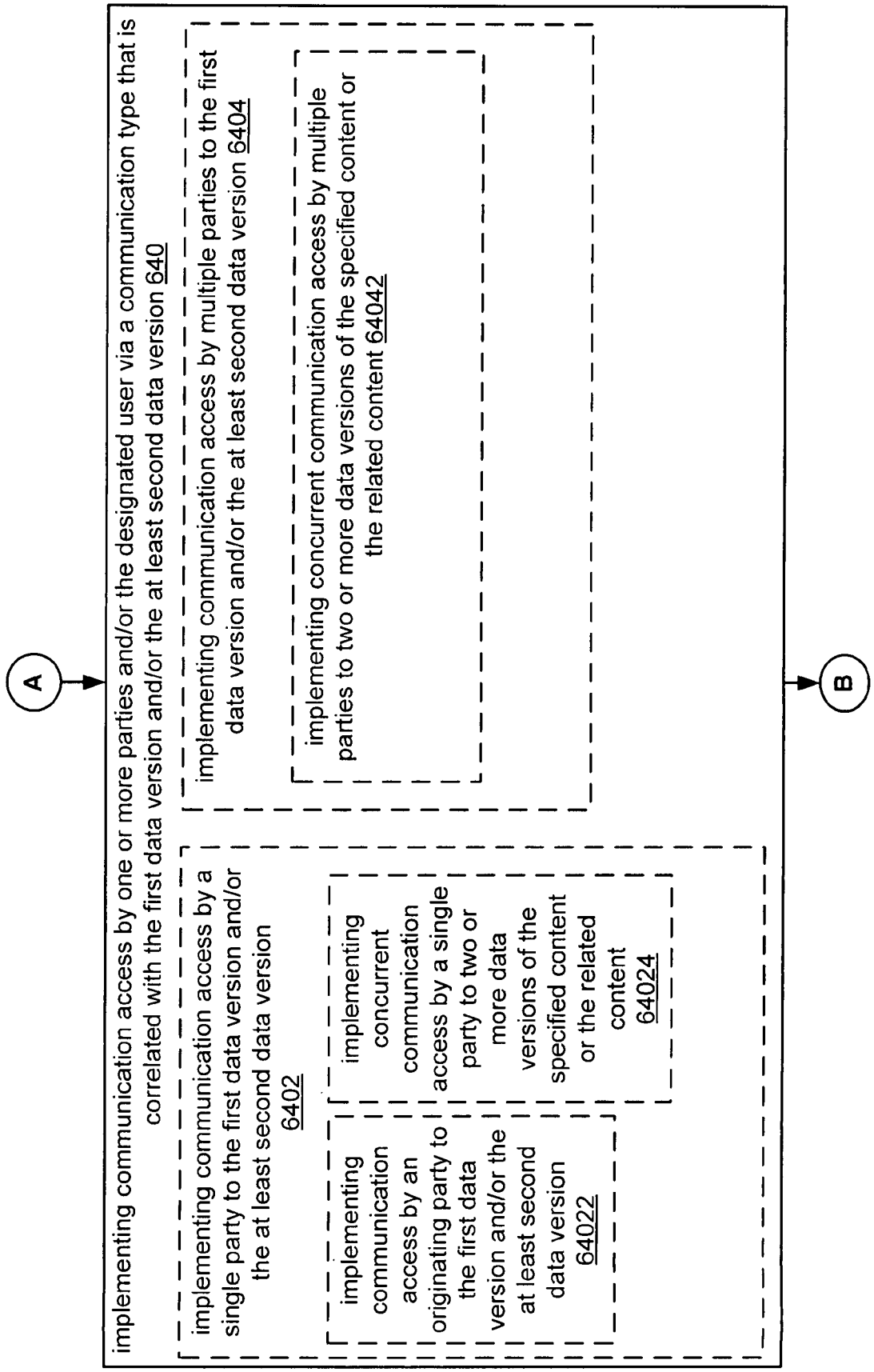

Referring now to FIG. 6B, the exemplary flow diagram illustrating a method in accordance with an embodiment continues with additional features. Specifically, Block 640 provides for implementing communication access by one or more parties and/or the designated user via a communication type that is correlated with the first data version and/or the at least second data version (e.g. transceiver 530 implementing communication access for a user or party via a communication type correlated to the data version).

Depicted within block 640 is block 6402, which provides for implementing communication access by a single party to the first data version and/or the at least second data version (e.g., transceiver 530 with access module 512 implementing communication access).

Depicted within block 6402 is block 64022 which provides for implementing communication access by an originating party to the first data version and/or the at least second data version (e.g., transceiver 530 implementing communication access by an originating party to the first data version and/or the at least second data version). Also depicted within block 6402 is block 64024 which provides for implementing concurrent communication access by a single party to two or more data versions of the specified content or the related content (e.g., transceiver 530 implementing concurrent communication access by a single party to two or more data versions).

Also depicted within block 640 is block 6404 which provides for implementing communication access by multiple parties to the first data version and/or the at least second data version (e.g., transceiver 530 implementing concurrent communication access by multiple parties to the first data version and/or the second data version).

Depicted within block 6404 is optional block 64042 which provides for implementing concurrent communication access by multiple parties to two or more data versions of the specified content or the related content (e.g. transceiver 530 implementing concurrent communication access by multiple parties to two or more data versions of the specified content or the related content).

Referring now to FIG. 6C, the exemplary flow diagram illustrating a method in accordance with an embodiment continues with additional features. Specifically, block 650 provides for converting the first data version of the specified content from the particular media format to at least a second media format (e.g., conversion module 550 converting data version of the specified content of the from the particular media format to a second media format).

Depicted within block 650 is optional block 6502 which provides for converting from the particular media format wherein the particular media format includes one or more of an image media format, a text messaging format, a video media format, an audio media format, a non-voice audio media format, a voice media format, a digital media format, and an analog media format (conversion module 550 converting from the particular media format).

Also depicted within block 650 is optional block 6504 which provides for converting to the at least second media format wherein the at least second media format includes one or more of an image media format, a text messaging format, a video media format, an audio media format, a non-voice audio media format, a voice media format, a digital media format, and an analog media format (e.g. conversion module 550 converting to a second media format wherein the media format is one or more of an image media format, a text messaging format, a video media format, an audio media format, a non-voice audio media format, a voice media format, a digital media format, and an analog media format). Optional block 6506 provides for providing communication access to the at least second data version of the related content, wherein the at least second data version is accessible in the different media format and also accessible in the particular media format (e.g., transceiver 550 providing communication access to the at least second data version of the related content, wherein the second data version is accessible via transceiver 550 in a different media format from media engine 540).

Block 670 provides for converting the first data version of selected content from the particular media format to one or more additional media formats (e.g., conversion module 550 converting the first data version of selected content from the particular media format to one or more additional media formats).

Depicted within block 670 is optional block 6702 which provides for selecting such additional media format in response to a management request from the designated user and/or the approved device (e.g., computing device 532, communication source 532, and/or network 108 representing a designated user and/or approved device providing a management request to media engine 540, media engine 540 responding to the management request by selecting an additional media format). Also depicted within block 670 is optional block 6704, which provides for converting wherein the particular media format and/or the one or more additional media formats includes one or more of an image media format, a text messaging format, a video media format, an audio media format, a non-voice audio media format, a voice media format, a digital media format, and an analog media format (e.g., conversion module converting to/from a media format that includes an image media format, a text messaging format, a video media format, an audio media format, a non-voice audio media format, a voice media format, a digital media format, and an analog media format).

Also depicted within block 670 is optional block 6706 which provides for converting the at least second data version of the related content from the different media format to the particular media format (e.g., conversion module 550 converting a data format to a particular media format).

Depicted within optional block 6706 is shown optional block 67062, which calls for providing communication access to the at least second data version of the related content, wherein the at least second data version is accessible in the different media format and also accessible in the particular media format (transceiver 530 and access module 512 providing access to a data version of related content, the data version being in either a particular media format or a different media format).

Figure 6D:
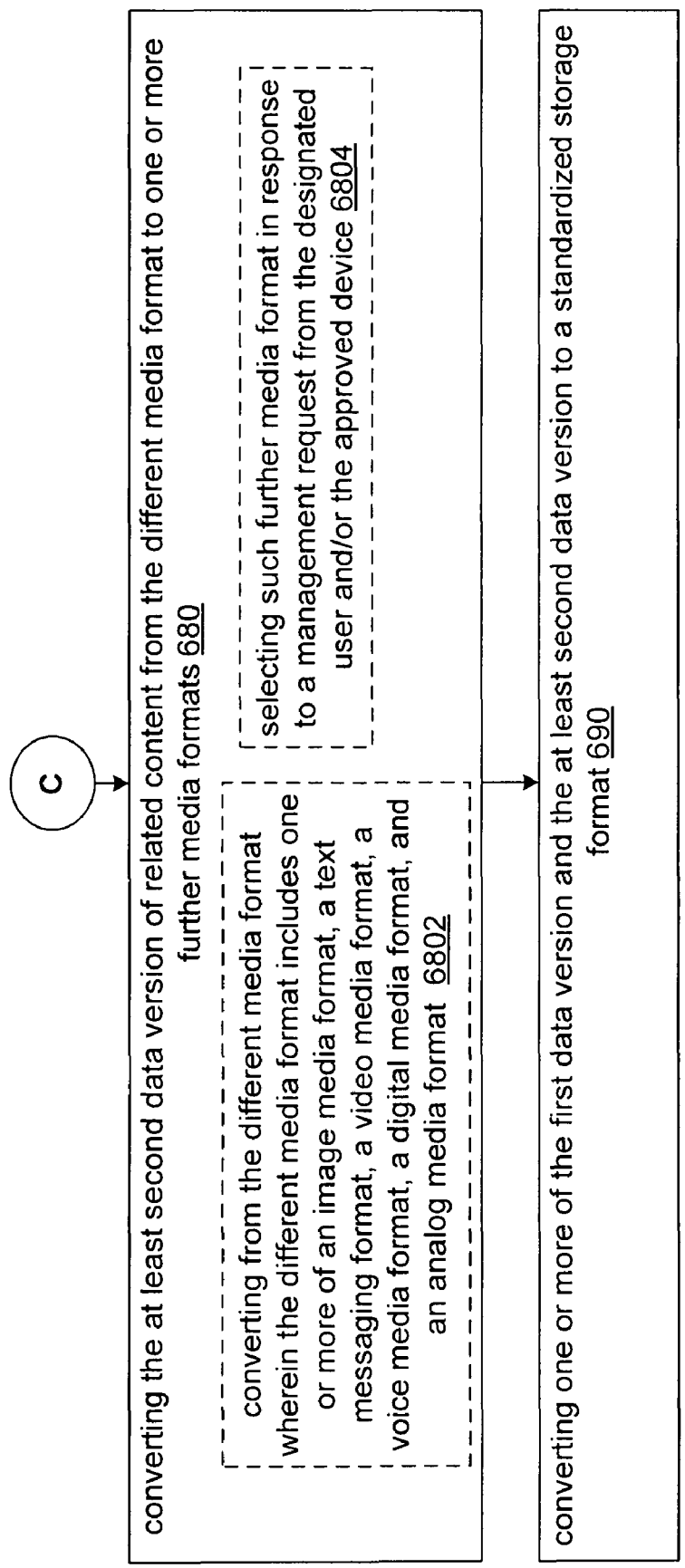

Referring now to FIG. 6D, the exemplary flow diagram illustrating a method in accordance with an embodiment continues with additional features. Specifically, block 680 provides for converting the at least second data version of related content from the different media format to one or more further media formats (e.g., conversion module 550 converting a data version of related content to a different media format).

Depicted within block 680 is optional block 6802 which provides for converting from the different media format wherein the different media format includes one or more of an image media format, a text messaging format, a video media format, a voice media format, a digital media format, and an analog media format (e.g., conversion 550 converting from a different media format, the different media format including one or more of an image media format, a text messaging format, a video media format, a voice media format, a digital media format, and an analog media format).

Block 680 further includes optional block 6804 which provides for selecting such further media format in response to a management request from the designated user and/or the approved device (media engine 540 receiving a management request via transceiver 540 from a designated user or device, such as computing device 532 that causes a selection of media format).

Block 690 provides for converting one or more of the first data version and the at least second data version to a standardized storage format (e.g., conversion module 550 converting a data version to a standardized format).

Figure 7A:
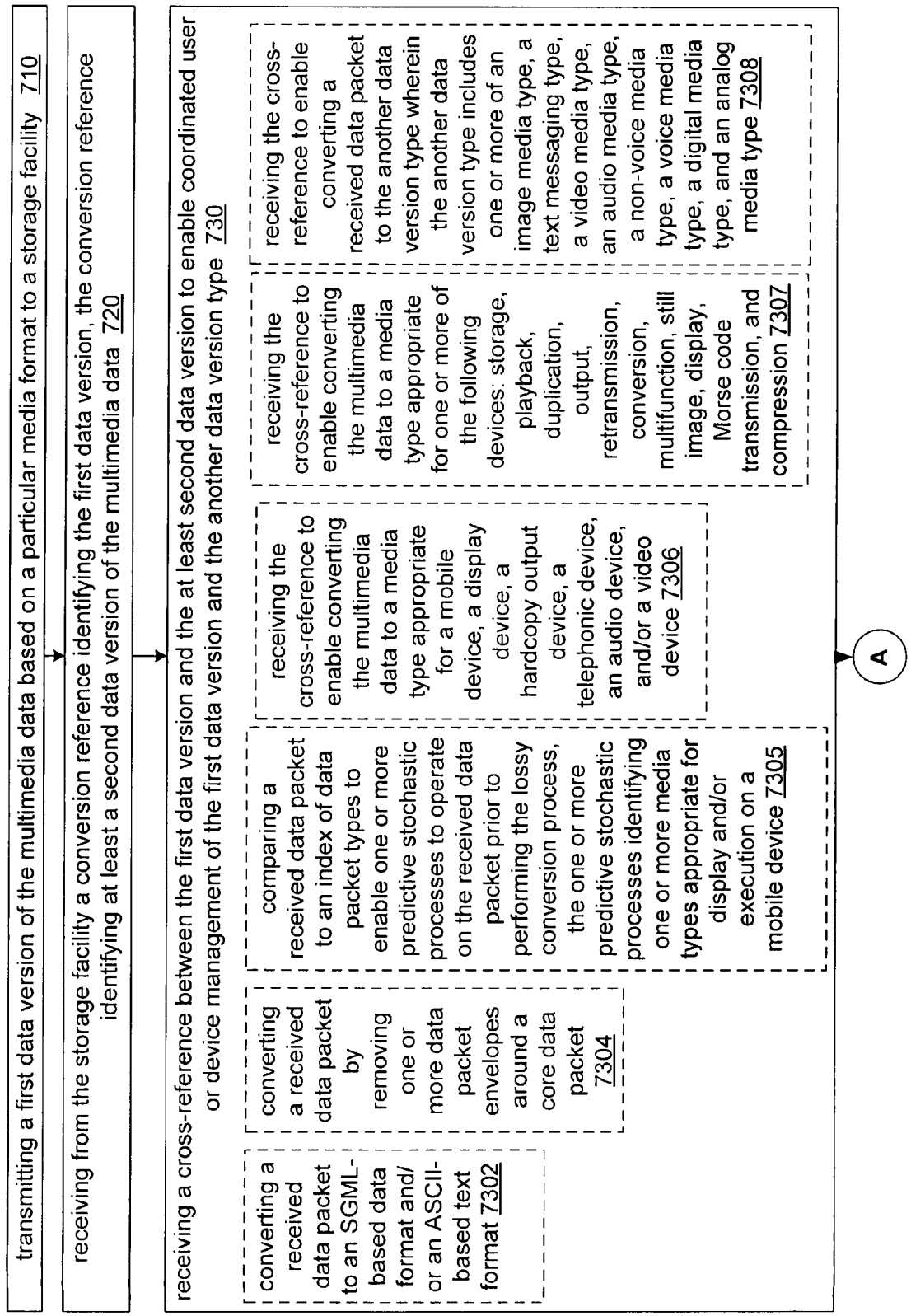

Referring now to FIG. 7, an exemplary flow diagram illustrates another method embodiment that includes various possible features for providing cross-media storage.

Specifically referring to FIG. 7, block 710 provides for transmitting a first data version of the multimedia data based on a particular media format to a storage facility (e.g., transceiver 530 transmitting a dataversion of multimedia data based on a particular media format to a storage facility, such as computing device 532).

Block 720 provides for receiving from the storage facility a conversion reference identifying the first data version, the conversion reference identifying at least a second data version of the multimedia data (e.g., transceiver 530 receiving from a storage facility a conversion reference produced by reference module 514 or conversion module 550 of a data version, the conversion reference identifying a second data version of multimedia data).

Block 730 provides for receiving a cross-reference between the first data version and the at least second data version to enable coordinated user or device management of the first data version and the another data version type (e.g., transceiver 530 receiving a cross-reference between a first data version and another data version to enable coordination module 554 to coordinate user and/or device management of data version and type).

Depicted within block 730 is optional block 7302, which provides for converting a received data packet to an SGML-based data format and/or an ASCII-based text format (e.g., conversion module 550 converting a data packet received via transceiver 530 to an SGML or ASCII format). For example, the converting data packets can be to SGML to enable a reduced data format, such as a data format appropriate for smart card usage, wireless phone usage, or another hypertext format.

Also depicted within block 730 is optional block 7304 which provides for converting a received data packet by removing one or more data packet envelopes around a core data packet (e.g., conversion module 550 converting a data packet received via transceiver 530 by removing data packet envelopes around a core data packet). Also depicted within block 730 is optional block 7305 which provides for comparing a received data packet to an index of data packet types to enable one or more predictive stochastic processes to operate on the received data packet prior to performing the lossy conversion process, the one or more predictive stochastic processes identifying one or more media types appropriate for display and/or execution on a mobile device (e.g., indexing module 520 and organization module 560 comparing data packets to an index to enable predictive stochastic processes to operate on data packets prior to conversion module 550 performing a lossy conversion process).

Another feature depicted within block 730 is optional block 7306 which provides for receiving the cross-reference to enable converting the multimedia data to a media type appropriate for a mobile device, a display device, a hardcopy output device, a telephonic device, an audio device, and/or a video device (e.g., transceiver 530 receiving a cross-reference to enable conversion module 550 to convert multimedia data to a media type appropriate for a mobile device, display device, hardcopy output device, telephone, audio device and/or voice device).

Also depicted within block 730 is optional 7307 which provides for receiving the cross-reference to enable converting the multimedia data to a media type appropriate for one or more of the following devices: storage, playback, duplication, output, retransmission, conversion, multifunction, still image, display, Morse code transmission, and compression (e.g., transceiver 530 receiving a cross-reference to enable conversion module 550 to convert multimedia data to a media type for storage, playback, duplication, output, retransmission, conversion, multifunction, still image, display, Morse code transmission, and compression).

Also depicted within block 730 is optional block 7308 which provides for receiving the cross-reference to enable converting a received data packet to the another data version type wherein the another data version type includes one or more of an image media type, a text messaging type, a video media type, an audio media type, a non-voice media type, a voice media type, a digital media type, and an analog media type (e.g., transceiver 530 receiving a cross-reference to enable conversion module 550 to convert multimedia data to a media type image media type, a text messaging type, a video media type, an audio media type, a non-voice media type, a voice media type, a digital media type, and an analog media type).

Referring now to FIG. 7B, the exemplary flow diagram illustrating a method in accordance with an embodiment continues with additional features. Specifically, the flow diagram continues with block 740, which provides for implementing communication access by one or more parties and/or the designated user via a communication type that is correlated with the first data version and/or the at least second data version (e.g., transceiver 530 implementing communication access by a party or designated user via a communication type correlated with a data type).

Depicted within block 740 is optional block 7402 which provides for implementing concurrent communication access by multiple parties to two or more data versions of the multimedia data (e.g., implementing concurrent communication via transceiver 530 for multiple parties to two or more versions of multimedia data). Also depicted within block 740 is optional block 7404, which provides for implementing concurrent communication access by a single party to two or more data versions of the multimedia data MISSING (e.g., implementing concurrent communication via transceiver 530 for a single party to two or more versions of multimedia data).

Following block 740 is block 750, which provides for initiating a search to locate the first data version and/or the at least second data version for possible retrieval by one or more parties and/or by the designated user (e.g., search engine 516 initiating a search to locate a first data version or second data version for possible retrieval via transceiver 530 for one or more parties or a designated user).

Following block 750 is block 760 which provides for obtaining retrieval of the first data version and/or the at least second data version by one or more parties and/or by the designated user (e.g., transceiver 530 retrieving the first data version or second data version and providing the data to a designated user or one or more parties over network 108 or directly to a computing device).

Another possible feature depicted in block 760 is illustrated as optional block 7602, which provides for obtaining retrieval of a responsive data packet using a media type appropriate for a destination device (e.g., transceiver 530 retrieving a responsive data packet via search engine 516, the responsive data packet using a media type appropriate for a destination device, such as computing device 532).

Also depicted within block 760 is optional block 7604, which provides for obtaining retrieval of a responsive data packet using an original particular media type (e.g., transceiver 530 retrieving a responsive data packet via search engine 516, the responsive data packet using an original media type).

Depicted in optional block 7604 is optional block 76042 which provides for providing a conversion tag to enable a conversion of the responsive data packet to the original particular media type (e.g., providing via conversion module 550 and tagging module 562 a conversion tag to enable conversion module 550 to convert the responsive data packet to an original media type).

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B. and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of providing storage accessibility for multimedia data, comprising:

storing a first data version of specified content based on a particular media format, the particular media format includes at least one or more of a first image media format, a first text messaging format, a first video media format, a first audio media format, a first voice media format, a first digital media format, and a first analog media format;

storing at least a second data version of related content based on a different media format, the different media format includes at least one or more of a second image media format, a second text messaging format, a second video media format, a second audio media format, a second voice media format, a second digital media format, and a second analog media format;

providing an identification tag between the first data version and the at least second data version to enable coordinated management by a designated user and/or an approved device for search and possible retrieval of the first data version and/or the at least second data version, the providing the identification tag being based upon at least one or more metadata, topic, location, statistical characteristics, predetermined characterization, date, author, creator, owner, individual identity, or user, of the specified content in the first data version and/or the related content of the second data version;

associating the identification tag with a database listing each of a plurality of alternative communication types to which one or more data packets holding the first data version and/or the second data version can be converted, wherein the converting comprises converting the one or more selected data packets from the original communication type to a communication type appropriate for a conference communication; and implementing communication access by one or more parties and/or the designated user via a communication type that is correlated with the first data version and/or the at least second data version via the identification tag.

2. The method of claim 1, wherein said storing at least a second data version of related content based on a different media format includes:

storing at least a second data version of related content wherein the related content includes content substantially identical to the specified content of the first data version.

3. The method of claim 1, wherein the providing an identification tag between the first data version and the at least second data version to enable coordinated management by a designated. user and/or an approved device for search and possible retrieval of the first data version and/or the at least second data version includes:

providing the identification tag to enable user accessibility to both the first data version and the at least second data version.

4. The method of claim 3, wherein the providing the identification tag to enable user accessibility to both the first data version and the at least second data version includes:

enabling selective retrieval of the first data version, or the at least second data version, or both without altering respective media formats of the first data version and/or the at least second data version.

5. The method of claim 3, wherein the providing the identification tag to enable user accessibility to both the first data version and the at least second data version includes:

enabling selective retrieval of the first data version and/or the at least second data version after conversion to one or more alternative media formats.

6. The method of claim 3, wherein the providing the identification tag to enable user accessibility to both the first data version and the at least second data version includes:

enabling selective forwarding of the first data version and/or the at least second data version after conversion to an alternative media format.

7. The method of claim 3, wherein the providing the identification tag to enable user accessibility to both the first data version and the at least second data version includes:

enabling selective editing by at least one or more designated user of the first data version and/or the at least second data version after conversion to an alternative media format.

8. The method of claim 7, wherein the enabling selective editing of the first data version and/or the at least second data version after conversion to an alternative media format includes:

storing the edited version in the alternative media format.

9. The method of claim 1, wherein the providing a identification tag between the first data version and the at least second data version to enable coordinated management by a designated user and/or an approved device for search and possible retrieval of the first data version and/or the at least second data version includes:

providing the identification tag based on subject matter of data in either the first data version and/or the at least second data version.

10. The method of claim 1, wherein the providing a identification tag between the first data version and the at least second data version to enable coordinated management by a designated user and/or an approved device for search and possible retrieval of the first data version and/or the at least second data version includes:

providing the identification tag based on a source or origin of the first data version and/or the at least second data version.

11. The method of claim 1, wherein the providing a between the first data version and the at least second data version to enable coordinated management by a designated user and/or an approved device for search and possible retrieval of the first data version and/or the at least second data version includes:

providing the based on one or more of the following aspects of the specified content and the related content: time, event, and photos.

12. The method of claim 1, wherein said implementing communication access by one or more parties and/or the designated user via a communication type that is correlated with the first data version and/or the at least second data version includes:

implementing communication access by a single party to the first data version and/or the at least second data version.

13. The method of claim 12, wherein said implementing communication access by a single party to the first data version and/or the at least second data version includes:

implementing communication access by an originating party to the first data version and/or the at least second data version.

14. The method of claim 12, wherein said implementing communication access by a single party to the first data version and/or the at least second data version includes:

implementing concurrent communication access by a single party to two or more data versions of the specified content or the related content.

15. The method of claim 1, wherein said implementing communication access by one or more parties and/or the designated user via a communication type that is correlated with the first data version and/or the at least second data version includes:

implementing communication access by multiple parties to the first data version and/or the at least second data version.

16. The method of claim 15, wherein said implementing communication access by multiple parties to the first data version and/or the at least second data version includes:

implementing concurrent communication access by multiple parties to two or more data versions of the specified content or the related content.

17. The method of claim 1, further comprising:

converting the first data version of the specified content from the particular media format to at least a second media format.

18. The method of claim 17, wherein the converting the first data version of the specified content from the particular media format to at least a second media format includes:

converting from the particular media format wherein the particular media format includes one or more of an image media format, a text messaging format, a video media format, an audio media format, a non-voice audio media format, a voice media format, a digital media format, and an analog media format.

19. The method of claim 17, wherein the converting the first data version of the specified content from the particular media format to at least a second media format includes:
converting to the at least second media format wherein the at least second media format includes one or more of an image media format, a text messaging format, a video media format, an audio media format, a non-voice audio media format, a voice media format, a digital media format, and an analog media format.

20. The method of claim 17, further comprising:
providing communication access to the first data version of the specified content, wherein the first data version is accessible in the particular media format and also accessible in the different media format.

21. The method of claim 1, further comprising:
converting the first data version of selected content from the particular media format to one or more additional media formats.

22. The method of claim 21, further comprising:
selecting such additional media format in response to a management request from the designated user and/or the approved device.

23. The method of claim 21, wherein the converting the first data version of selected content from the particular media format to one or more additional media formats includes:
converting wherein the particular media format and/or the one or more additional media formats includes one or more of an image media format, a text messaging format, a video media format, an audio media format, a non-voice audio media format, a voice media format, a digital media format, and an analog media format.

24. The method of claim 21, further comprising:
converting the at least second data version of the related content from the different media format to the particular media format.

25. The method of claim 24, further comprising:
providing communication access to the at least second data version of the related content, wherein the at least second data version is accessible in the different media format and also accessible in the particular media format.

26. A computer-readable storage media having computer-readable instructions thereon which, when executed by a computer, implement a method comprising:
storing a first data version of specified content based on a particular media format, the particular media format includes at least one or more of a first image media format, a first text messaging format, a first video media format, a first audio media format, a first voice media format, a first digital media format, and a first analog media format;
storing at least a second data version of related content based on a different media format, the different media format includes at least one or more of a second image media format, a second text messaging format, a second video media format, a second audio media format, a second voice media format, a second digital media format, and a second analog media format;
providing an identification tag between the first data version and the at least second data version to enable coordinated management by a designated user and/or an approved device for search and possible retrieval of the first data version and/or the at least second data version, the providing the identification tag is based upon at least one or more of metadata, topic, location, statistical characteristics, predetermined characterization, date, author, creator, owner, individual identity, or user, of the specified content in the first data version and/or the related content of the second data version;
associating the identification tag with a database listing each of a plurality of alternative communication types to which one or more data packets holding the first data version and/or the second data version can be converted, wherein the converting comprises converting the one or more selected data packets from the original communication type to a communication type appropriate for a conference communication; and
implementing communication access by one or more parties and/or the designated user via a communication type that is correlated with the first data version and/or the at least second data version via the identification tag.

27. The computer-readable storage media of claim 26 wherein the signal bearing medium comprises:
a recordable medium.

28. The computer-readable storage media of claim 26, wherein the signal bearing medium comprises:
a transmission medium.

29. The computer-readable storage media of claim 26, wherein the providing an identification tag between the first data version and the at least second data version to enable coordinated management by a designated user and/or an approved device for search and possible retrieval of the first data version and/or the at least second data version includes:
providing the identification tag to enable user accessibility to both the first data version and the at least second data version.

30. The computer-readable storage media of claim 29, wherein the providing the identification tag to enable user accessibility to both the first data version and the at least second data version includes:
enabling selective retrieval of the first data version, or the at least second data version, or both without altering respective media formats of the first data version and/or the at least second data version.

31. The computer-readable storage media of claim 29, wherein the providing the identification tag to enable user accessibility to both the first data version and the at least second data version includes:
enabling selective retrieval of the first data version and/or the at least second data version after conversion to one or more alternative media formats.

32. The computer-readable storage media of claim 29, wherein the providing the identification tag to enable user accessibility to both the first data version and the at least second data version includes:
enabling selective forwarding of the first data version and/or the at least second data version after conversion to an alternative media format.

33. The computer-readable storage media of claim 29, wherein the providing the identification tag to enable user accessibility to both the first data version and the at least second data version includes:
enabling selective editing of the first data version and/or the at least second data version after conversion to an alternative media format.

34. The computer-readable storage media of claim 33, wherein the enabling selective editing of the first data version and/or the at least second data version after conversion to an alternative media format includes:
storing the edited version in the alternative media format.

35. The computer-readable storage media of claim 26, wherein said implementing communication access by one or more parties and/or the designated user via a communication type that is correlated with the first data version and/or the at least second data version includes:

implementing communication access by a single party to the first data version and/or the at least second data version.

36. The computer-readable storage media of claim 35, wherein said one or more, instructions for implementing communication access by a single party to the first data version and/or the at least second data version includes:

implementing communication access by an originating party to the first data version and/or the at least second data version.

37. The computer-readable storage media of claim 35, wherein said implementing communication access by a single party to the first data version and/or the at least second data version includes:

implementing concurrent communication access by a single party to two or more data versions of the specified content or the related content.

38. The computer-readable storage media of claim 26, wherein said implementing communication access by one or more parties and/or the designated user via a communication type that is correlated with the first data version and/or the at least second data version includes:

implementing communication access by multiple parties to the first data version and/or the at least second data version.

39. The computer-readable storage media of claim 26 further comprising:

converting the first data version of the specified content from the particular media format to at least a second media format.

40. The computer-readable storage media of claim 39, wherein said converting the first data version of the specified content from the particular media format to at least a second media format includes:

converting from the particular media format, wherein the particular media format includes one or more of an image media format, a text messaging format, a video media format, an audio media format, a non-voice audio media format, a voice media format, a digital media format, and an analog media format.

41. The computer-readable storage media of claim 39, wherein said converting the first data version of the specified content from the particular media format to at least a second media format includes:

converting to the at least second media format, wherein the at least second media format includes one or more of an image media format, a text messaging format, a video media format, an audio media format, a non-voice audio media format, a voice media format, a digital media format, and an analog media format.

42. The computer-readable storage media of claim 26 further comprising:

converting the first data version of selected content from the particular media format to one or more additional media formats.

43. The computer-readable storage media of claim 42 further comprising:

selecting such additional media format in response to a management request from the designated user and/or the approved device.

44. The computer-readable storage media of claim 42, wherein the converting the first data version of selected content from the particular media format to one or more additional media formats includes:

converting, wherein the particular media format and/or the one or more additional media formats includes one or more of an image media format, a text messaging format, a video media format, an audio media format, a non-voice audio media format, a voice media format, a digital media format, and an analog media format.

45. The computer-readable storage media of claim 42 further comprising:

converting the at least second data version of the related content from the different media format to the particular media format.

46. The computer-readable storage media of claim 26 further comprising:

converting the at least second data version of related content from the different media format to one or more further media formats.

47. The computer-readable storage media of claim 46, wherein the converting the at least second data version of related content from the different media format to one or more further media formats includes:

converting from the different media format wherein the different media format includes one or more of an image media format, a text messaging format, a video media format, a voice media format, a digital media format, and an analog media format.

48. The computer-readable storage media of claim 46, further comprising:

selecting such further media format in response to a management request from the designated user and/or the approved device.

49. The computer-readable storage media of claim 26 further comprising:

converting one or more of the first data version and the at least second data version to a standardized storage format.

50. A media system for integrating one or more types of media, the media system comprising:

a processor;

a memory coupled to the processor; and a media engine coupled to the processor, the media engine configured to integrate a first data version of specified content with at least a second data version of related content, the media engine including:

a data store configured to store the first data version of specified content based on a particular media format, the particular media format includes at least one or more of a first image media format, a first text messaging format, a first video media format, a first audio media format, a first voice media format, a first digital media format, and a first analog media format, and store the at least second data version of related content based on a different media format, the different media format includes at least one or more of a second image media format, a second text messaging format, a second video media format, a second audio media format, a second voice media format, a second digital media format, and a second analog media format;

a reference module configured to provide an identification tag between the first data version and the at least second data version to enable search and possible retrieval of the first data version and/or the at least second data version, the identification tag being based upon at least one or more of metadata, topic, location, statistical characteristics, predetermined characterization, date, author, creator, owner, individual identity, or user, of the specified content in the first data version and/or the related content of the second data version, the reference module configured to associate the identification tag with a database listing each of a plurality of alternative communication types to which one or more data packets holding the first data version and/or the second data version can be converted wherein the one or more selected data packets are converted from the original communication type to a communication type appropriate for a conference communication; and an access module configured to enable communication access by one or more parties and/or a designated user via a communication type that is correlated via at least the identification tag associated with the first data version and/or the at least second data version.

51. The media system of claim 50, wherein the access module is configured to implement communication access by a single party and/or an originating party and/or multiple parties to the first data version and/or the at least second data version.

52. The media system of claim 50 wherein the access module is coupled to a conversion module to enable communication access following a conversion of a particular media format wherein the particular media format includes one or more of an image media format, a text messaging format, a video media format, an audio media format, a non-voice audio media format, a voice media format, a digital media format, and an analog media format.

* * * * *

UNITED STATES PATENT AND TRADEMARK OFFICE
CERTIFICATE OF CORRECTION

| | |
|---|---|
| PATENT NO. | : 7,860,887 B2 |
| APPLICATION NO. | : 11/799039 |
| DATED | : December 28, 2010 |
| INVENTOR(S) | : Alexander J. Cohen et al. |

It is certified that error appears in the above-identified patent and that said Letters Patent is hereby corrected as shown below:

Column 23, line 23, claim 3: "designated. user" should read --designated user--

Column 23, lines 62-63, claim 9: "providing a identification tag" should read --providing an identification tag--

Column 24, lines 4-5, claim 10: "providing a identification tag" should read --providing an identification tag--

Column 24, lines 13-14, claim 11: "providing a between the" should read --providing an identification tag between the--

Signed and Sealed this
Ninth Day of April, 2013

Teresa Stanek Rea
*Acting Director of the United States Patent and Trademark Office*